US012456020B1

(12) United States Patent
Mishra et al.

(10) Patent No.: US 12,456,020 B1
(45) Date of Patent: Oct. 28, 2025

(54) SYSTEMS AND METHODS FOR UPDATING LARGE LANGUAGE MODELS

(71) Applicant: Amazon Technologies, Inc., Seattle, WA (US)

(72) Inventors: Kshitij Mishra, Lawndale, CA (US); Tamer Soliman, Millbrae, CA (US); Aram Galstyan, Los Angeles, CA (US); Anoop Kumar, Fountain Valley, CA (US); Anil K Ramakrishna, Culver City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 18/461,143

(22) Filed: Sep. 5, 2023

(51) Int. Cl.
*G06F 17/27* (2006.01)
*G06F 40/40* (2020.01)

(52) U.S. Cl.
CPC .................... *G06F 40/40* (2020.01)

(58) Field of Classification Search
CPC ......... G06F 40/30; G06F 40/40; G06F 40/284
USPC ............................................................ 704/9
See application file for complete search history.

(56) References Cited

U.S. PATENT DOCUMENTS

2023/0169333 A1* 6/2023 Choi ..................... G06N 3/08
2024/0347064 A1* 10/2024 Li .......................... G06F 40/30
2024/0386202 A1* 11/2024 Hoffman ................ G06F 40/30

OTHER PUBLICATIONS

Eric Mitchell and Charles Lin. "Fast Model Editing at Scale," International Conference on Learning Representations, 2022, 21 pages. Retrieved from https://openreview.net/forum?id=0DcZxeWfOPt.
James Thorne, et al. "FEVER: a Large-scale Dataset for Fact Extraction and VERification," Proceedings of the NAACL-HLT 2018, vol. 1 (Long Papers), Jun. 2018, pp. 809-819.
Nicola De Cao, et al. "Editing Factual Knowledge in Language Models," Proceedings of the 2021 Conference on Empirical Methods in Natural Language Processing, Nov. 2021, pp. 6491-6506.
Anton Sinitsin, et al. "Editable Neural Networks," International Conference on Learning Representations, 2020, 2 pages. Retrieved from https://openreview.net/forum?id=HJedXaEtvS.
Roman Levin, et al. "Where do Models go Wrong? Parameter-Space Saliency Maps for Explainability," Advances in Neural Information Processing Systems 35 (NeurIPS 2022), 14 pages.
Omer Levy, et al. "Zero-Shot Relation Extraction via Reading Comprehension," Proceedings of the 21st Conference on Computational Natural Language Learning (CoNLL 2017), Aug. 2017, pp. 333-342.

* cited by examiner

Primary Examiner — Md S Elahee
(74) Attorney, Agent, or Firm — Pierce Atwood LLP

(57) ABSTRACT

Techniques for updating a large language model (LLM) to correct generation of undesired responses, such as incorrect outputs, toxic outputs, etc. are described. Typical methods of retraining and fine-tuning are inefficient and computationally expensive for LLMs. Some embodiments of the present disclosure involve identifying a salient layer of the LLM that is responsible for the undesired response and editing only the salient layer. This layer is identified by computing a saliency value for the layer using a mean of gradient values for the layer, and the layer with the greatest saliency value is selected for editing. For editing, a small network is used to update the weights of the selected layer. The LLM is updated to include the edited layer, and the updated LLM is used for future processing.

20 Claims, 12 Drawing Sheets

SYSTEMS AND METHODS FOR UPDATING LARGE LANGUAGE MODELS

BACKGROUND

Natural language processing systems have progressed to the point where humans can interact with computing devices using their voices and natural language textual input. Such systems employ techniques to identify the words spoken and written by a human user based on the various qualities of received input data. Speech recognition combined with natural language understanding processing techniques enable speech-based user control of computing devices to perform tasks based on the user's spoken inputs. Such processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
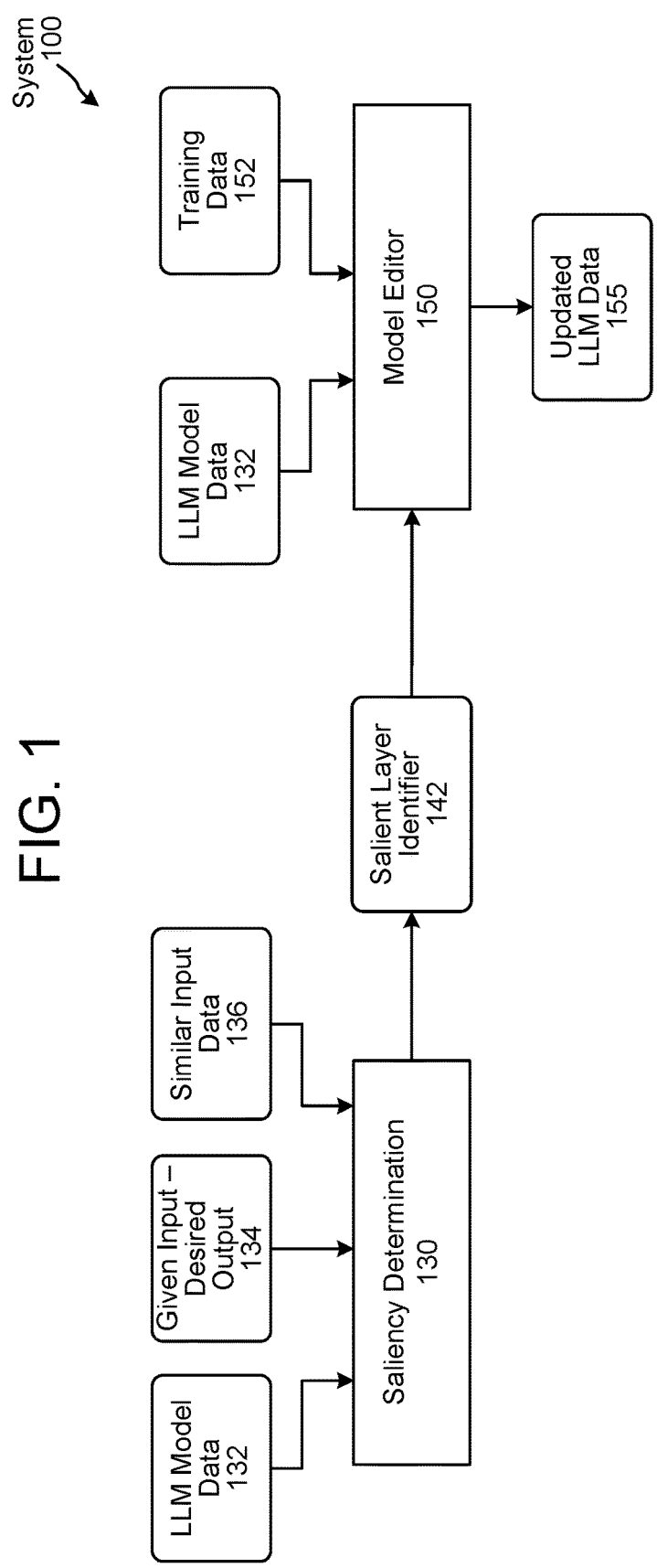
FIG. 1 is a conceptual diagram illustrating an example system for updating a layer of a large language model (LLM) to generate desired outputs, according to embodiments of the present disclosure.

Automatic speech recognition (ASR) is a field of computer science, artificial intelligence, and linguistics concerned with transforming audio data associated with speech into a token or other textual representation of that speech. Similarly, natural language understanding (NLU) is a field of computer science, artificial intelligence, and linguistics concerned with enabling computers to derive meaning from natural language inputs (such as spoken inputs). ASR and NLU are often used together as part of a language processing component of a system. Text-to-speech (TTS) is a field of computer science concerning transforming textual and/or other data into audio data that is synthesized to resemble human speech. Natural language generation (NLG) is a field of artificial intelligence concerned with automatically transforming data into natural language (e.g., English) content.

Language modeling (LM) is the use of various statistical and probabilistic techniques to determine the probability of a given sequence of words occurring in a sentence. LM can be used to perform various tasks including generative tasks that involve generating data rather than discriminating between given classes. Language models analyze bodies of text data to provide a basis for their word predictions. The language models are generative models. In some embodiments, the language models may be a large language model (LLM). An LLM is an advanced artificial intelligence/machine learning system designed to process, understand, and generate human-like text based on massive amounts of data. An LLM model may be built using deep learning techniques, such as neural networks, and may be trained on extensive datasets that include text (or other type of data) from a broad range of sources, such as books and websites, for natural language processing. An LLM uses an expansive training dataset, as compared to a language model, and can include a large number of parameters (in the range of billions), hence, they are called "large" language models. In some embodiments one or more of the language models (and their corresponding operations, discussed herein below) may be the same language model.

Certain systems may be configured to respond to natural language (e.g., spoken or typed) user inputs. For example, in response to the user input "what is today's weather," the system may output weather information for the user's geographic location. As another example, in response to the user input "what are today's top stories," the system may output one or more news stories. For further example, in response to the user input "tell me a joke," the system may output a joke to the user. As another example, in response to the user input "book me a flight to Seattle," the system may book a flight to Seattle and output information of the booked flight. For further example, in response to the user input "lock the front door," the system may actuate a "front door" smart lock to a locked position.

A system may receive a user input as speech. For example, a user may speak an input to a device. The device may send audio data, representing the spoken input, to the system. The system may perform ASR processing on the audio data to generate ASR data (e.g., text data, token data, etc.) representing the user input. The system may perform processing on the ASR data to determine an action responsive to the user input.

In some embodiments, the system may be configured to process the ASR data (or other type of data representing another type of user input) using one or more language models (e.g., one or more LLMs) to determine the action responsive to the user input. For example, in response to the user input "Please plan a 4-person trip to [Location] from [Date 1] to [Date 2]," the system may determine that the user wants to book a trip to [Location] during the specified dates. Thereafter, the system may use the language model(s) to generate one or more tasks associated with booking the trip (e.g., (1) find a flight ticket from the user's location to [Location] leaving on [Date 1] and returning on [Date 2]; and (2) find a hotel in [Location] between [Date 1] and [Date 2]) and select a task of the one or more tasks to be performed first (e.g., (1) find a flight ticket leaving the user's location on [Date 1] and returning on [Date 2].) The system may determine one or more components (e.g., a skill component, a LLM agent component, etc.) configured to perform action(s) associated with a task.

The present disclosure relates to techniques for updating a LLM to cause generation of desired responses. Techniques described herein can be used as a re-training or reconfiguring technique for a LLM. Some embodiments of the present disclosure involve identifying a portion of the LLM, such as a layer of the LLM, that is responsible for (i.e., has the most impact in) generating an output by processing an input, where the output may be an undesired response for the input. An undesired response, as used herein, may refer to an incorrect response to an input, an inappropriate response (e.g., a biased, harmful, violent, etc. response), or otherwise a response that is not expected/desired (e.g., by a user that provided the input, a model developer, a system administrator, etc.). The portion/layer identified as being responsible for generating the output may be referred to herein as "salient" portion/layer. Embodiments of the present disclosure involve updating the salient portion/layer of the LLM and determining an updated LLM that includes the updated salient portion/layer so that the updated LLM is configured to output desired responses.

In some embodiments, the system may identify a salient layer by determining a saliency value for each layer of the LLM. The saliency value may be based on gradient values for each parameter of the layer, where the parameter may correspond to a sub-node of a node of a layer. In example embodiments, the system uses a two-dimensional (2D) representation, for example a table, of the gradient values for each parameter of the LLM, where a table column represents gradient values for parameters of an individual node. The system may first compute a node-level saliency value by combining the gradient values (e.g., determining an average of the gradient values) within a column, which may result in multiple node-level saliency values, each corresponding to a node of a LLM layer. Then the system may compute a layer-level saliency value by combining the multiple node-level saliency values (e.g., determining an average of the node-level saliency values), which may result in a single saliency value for the LLM layer. After determining a saliency value for each LLM layer, the system may then identify a layer (the salient layer) with the highest (or lowest depending on system configuration) saliency value as the layer that is responsible for generating the undesired response. In other words, the layer with the highest saliency value has the greatest contribution to the erroneous/undesired response.

Some embodiments of the present disclosure involve editing only the salient layer, rather than updating the entire LLM, to cause the LLM to generate desired responses. In example embodiments, the system may use a small neural network (e.g., a 3-layer network) to update (e.g., retrain) weight values for the parameters of the salient layer, where the updating may be performed using training data that includes a desired response for the input. The training data may also include other inputs that may be (semantically or lexically) similar to the input, so that the updated layer/LLM is configured to generate desired responses to similar inputs. The training data may also include other inputs and corresponding outputs that the LLM was already generating desired responses for, so that the updated layer/LLM is still generating desired responses to other inputs. The updated salient layer may be inserted into the LLM (e.g., the original salient layer is replaced by the updated salient layer), thus, updating the LLM. The LLM updated in this manner, can now generate a desired response to a subsequently received input.

Updating LLMs is important to ensure that the model is generating desired responses. LLMs, like other machine learned models, can become obsolete over time and result in undesired responses, where obsoletion can be due to changes in current knowledge versus the knowledge that the LLM was originally trained on (e.g., changes in heads of countries, changes in organizations, etc.). Conventional approaches for updating models are retraining the entire model or finetuning. However, retraining and finetuning can be computationally inefficient and highly expensive given the size of the LLM. Teachings of the present disclosure provide, among other things, a precise mechanism to identify parameters of the LLM that are causing the failure, and a computationally efficient mechanism, in terms of time and memory, to update the LLM. The techniques described herein are adaptable to different LLMs, results in enhanced performance of a LLM (where the updated model generates more accurate/desired responses), and can be used to correct different types of undesired responses (e.g., incorrect response, inappropriate response, etc.). Thus, techniques of the present disclosure improve processing of a computing device by providing a more efficient training mechanism for a LLM and by generating a more accurate LLM.

A system according to the present disclosure will ordinarily be configured to incorporate user permissions and only perform activities disclosed herein if approved by a user. As such, the systems, devices, components, and techniques described herein would be typically configured to restrict processing where appropriate and only process user data in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1 is a conceptual diagram illustrating a system 100 for updating a portion of a LLM to generate a desired response to an input, according to embodiments of the present disclosure. The system 100, in some embodiments, may include a saliency determination component 130 and a model editor component 150. For a given input that a LLM processes and generates an undesired response, the system 100 (e.g., using the saliency determination component 130) determines a salient portion (e.g., one or more layers) of the LLM that is responsible for the undesired response, where the salient portion is determined based on gradient values (based on the LLM processing the input) of the parameters of the salient portion. Then the system 100 (e.g., using the model editor component 150) updates the determined salient portion using an updated loss function based on the desired response to the given input, and generates an updated LLM that includes the updated salient portion. Such a system is computationally inexpensive because there is only one layer, the salient layer, that is being updated, unlike in retraining or finetuning where all the layers of a model are updated.

The system 100 may be used to update one or more of the LLMs described below in relation to system component(s) 120, in particular, a LLM orchestrator 530. Similar techniques may be used to update other machine learning models that may be implemented by the system component(s) 120 or a user device 110. Example embodiments relate to updating an LLM that is configured to take as an input text data and generate as an output text data (e.g., a text-to-text LLM). The techniques described herein can be used to update other types of generative models, for example, a model configured to take as an input text data and generate as an output image data (e.g., a text-to-image generation model), a model configured to take as an input text data and generate as an output audio data (e.g., a text-to-audio generation model), a model configured to take as an input image data and generate as an output text data (e.g., a image-to-text generation model), a model configured to take as an input audio data and generate as an output text data (e.g., an audio-to-text generation model), multi-modal models that are configured to take as input two (or more) different types of data and/or output two (or more) different types of data (e.g., a model that takes an audio input and text input, a model that takes an audio input and an image/video input, a model that outputs text and audio, a model that outputs text and image, etc.) etc. Components of the system 100 shown in FIG. 1 may be implemented as part of the system component(s) 120 or may be implemented as part of a separate system that is in communication with the system component(s) 120.

The examples herein describe identifying a salient layer of a model and updating the salient layer. Techniques similar to those described herein can be used to identify more than one salient layer of the model (e.g., salient layers with top-n saliency values) and update the identified salient layers. Techniques similar to those described herein can be used to identify a salient portion of the model (e.g., one or more parameters, one or more nodes, other features of a model that may not be a neural network based model, etc.) and update the identified salient portion (e.g., update the identified parameter(s), node(s), other feature(s), etc.).

The system 100 may be used by a user, such as a model developer, a system administrator, etc., to update an LLM by providing LLM model data 132 to the saliency determination component 130. As described above, a LLM may consist of multiple layers. Each layer may consist of multiple nodes and each node may consist of multiple parameters (e.g., sub-nodes). Thus, a LLM may consist of multiple parameters.

In some embodiments, the LLM model data 132 may represent gradient values for each parameter of the LLM. A gradient value represents the model's "flow" towards a zero loss. The gradient value may be the amount by which an activation of the parameter needs to change to generate a correct/desired output. A low or small gradient value may indicate that the corresponding parameter results in the desired output. A high or large gradient value may indicate that the corresponding parameter results in an undesired output. A parameter with a high gradient value can be considered as contributing to generation of an erroneous/undesired output. The gradient values, included in the LLM model data 132, may be determined based on the LLM (that is to be updated) processing a given input and generating an undesired response.

In some embodiments, the LLM model data 132 may be model weights, parameter values, etc. corresponding to the LLM. In such embodiments, the saliency determination component 130 may determine the gradient values for each parameter of the LLM, where such gradient values may be based on the LLM processing the given input (included in the data 134). As such, the gradient values correspond to the LLM's erroneous processing with respect to the given input.

In some embodiments, the LLM model data 132 may be model loss data corresponding to the LLM processing of the given input. The model loss data may be based on a comparison of the desired output and the undesired output. For example, the model loss data may be a difference between the LLM parameter values when generating the undesired output and what the LLM parameter values should be if the desired output was generated. The saliency determination component 130 may determine the gradient values for each parameter of the LLM using the model loss data.

Figure 3:
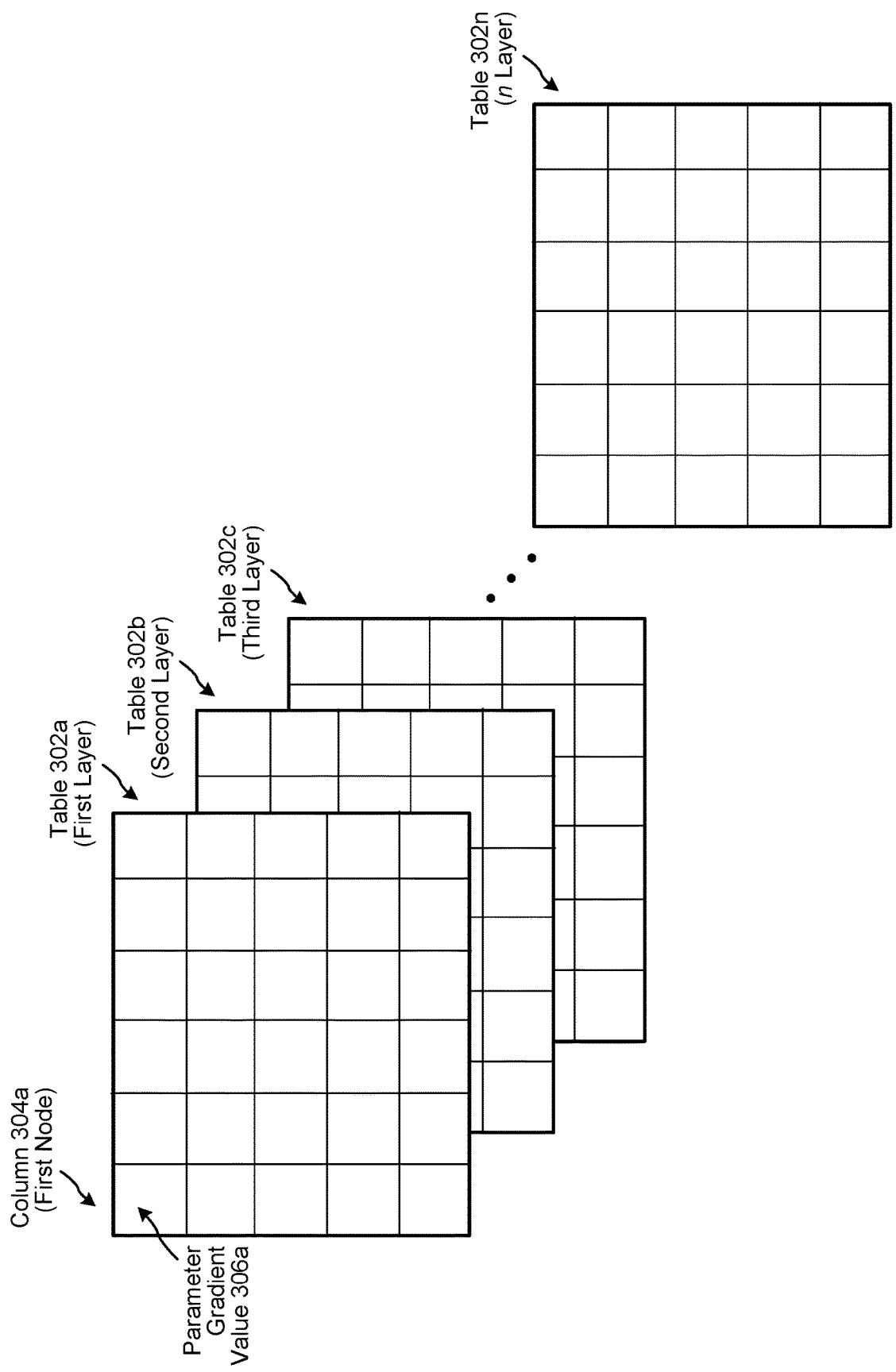
FIG. 3 is a conceptual diagram illustrating parameter gradient value data in a table form, according to embodiments of the present disclosure.

In some embodiments, the LLM model data 132 may be a 2D representation of the gradient values of the parameters of the LLM, for example, one or more tables including the gradient values. In example embodiments, the LLM model data 132 may include multiple tables, where an individual table corresponds to a layer of the LLM. Within the individual table, a column may correspond to a node of the layer, and rows of that column may correspond to parameters/sub-nodes of that node. For example, the LLM model data 132 may include a first table corresponding to a first layer and including first gradient values for the first parameters of the first layer; a second table corresponding to a second layer and including second gradient values for the second parameters of the second layer. FIG. 3 illustrates example LLM model data in table form. As shown, a table 302a may include gradient values for a first layer of the LLM, table 302b may include gradient values for a second layer of the LLM, table 302c may include gradient values for a third layer of the LLM, and so on. Within the table 302a, a column 304a may include gradient values for a first node of the first layer. The column 304a may include parameter gradient values 306 corresponding to the parameters of the first node.

The saliency determination component 130 may also receive given input-desired output data 134, which may represent a given input (that the LLM is generating an undesired response for) and a desired response for the given input. The given input-desired output data 134 may be a tuple/pair or otherwise an association between the given input and the desired output (e.g., [input, output]). The given input-desired output data 134 may be text data, token data, or other type of data depending on the configuration of the LLM. Like the LLM model data 132, the given input-desired output data 134 may be provided by a user.

The saliency determination component 130 may also receive similar input data 136, which may represent inputs that are similar to the given input or that correspond to the desired output data. The similar input data 136 may include inputs that are semantically or lexically similar to the given input (included in data 134). The similar input data 136 may include inputs for which the desired output (included in data 134) is a desired/correct response. For example, for the given input "who is the Prime Minister of [country]?", the similar input data 136 may include inputs "who is the head of the government of [country]?", "who is the leader of [country]?", etc.

The saliency determination component 130 may determine a salient layer of the LLM that is responsible for generating an undesired response to the given input and may output a salient layer identifier 142 associated with the determined salient layer. In some embodiments, the layers of the LLM may be associated with an identifier (e.g., an alphanumerical value), and the saliency determination component 130 may output the identifier for the salient layer.

Consider a base model $f_\theta(x)=y$; where x represents the inputs, θ represents the set of trained parameters, and y represents the outputs. The objective of model editing is to facilitate the modification of $f_\theta(\ )$ to $f_{\theta n}(\ )$ to ensure wrongly predicted or obsolete outputs $y_w$ for given inputs $x_w$ to correct outputs $y_c$, (i.e. old learned parameters θ are mapped to new learned parameters $θ_n$. In learning new parameters $θ_n$, model should be able to adapt the edits for similar editing inputs $x_w$, and be unchanged for "truly" predicted inputs $x_t$. The model editor component 150 may be configured to determine the new parameters $θ_n$ based on taking inputs: editing inputs-output pairs $(x_e, y_e)=(x_w, y_c)\cup(x_{w'}, y_c)$, true pairs $(x_t, y_t)$, and base model parameters θ. It can be formalized as:

$$f_\phi(x_e, y_e, x_t, y_t, θ) = θ_n \qquad \text{Equation (1)}$$

In a model editing problem, editing all parameters tend to be computationally expensive and may lead to over fitting on edited samples losing the consistency aspects of edited model. Therefore, the system 100 first identifies the most salient network parameters responsible for the undesired response, then perform edits only on these salient parameters.

Figure 2:
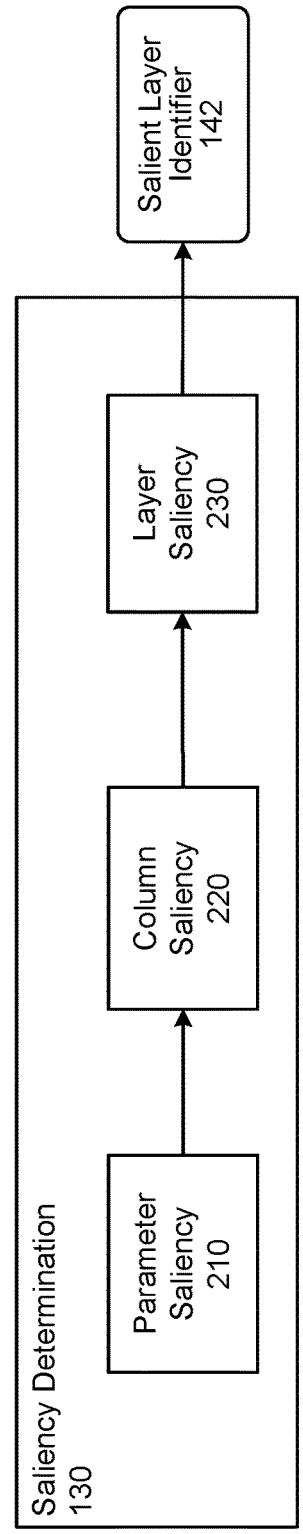
FIG. 2 is a conceptual diagram illustrating an example saliency determination component, according to embodiments of the present disclosure.

FIG. 2 illustrates example components for the saliency determination component 130. As shown, the saliency determination component 130 may include a parameter saliency component 210, a column saliency component 220 and a layer saliency component 230.

For a given base model $f_θ(\ )$ first the saliency determination component 130 may compute the layer saliency profiles/values for each of the layers of the model with respect to validation data $D_{edit} = \{x_e, y_e\}$, which, as described above, represents input-output pairs of (i) a given input and corresponding desired output; and (ii) inputs similar to the given input and the desired output. The saliency determination component 130 may use gradient information from the loss function as a measure of parameter sensitivity. A loss function is a function that compares the target (in this case the desired output) and predicted output values (in this case the undesired output).

In some embodiments, the saliency determination component 130 may identify the salient layer using various computations. First, the parameter saliency component 210 may determine parameter-wise saliency values, then the column saliency component 220 may determine column-wise saliency values corresponding to a node of a layer, then the layer saliency component 230 may determine layer-wise saliency values and select a salient layer.

The parameter saliency component 210 may be configured to determine the parameter wise saliency values by computing the gradients, represented by s in the equation below, of the loss on validation data $D_{edit}$ with respect to trained parameters:

$$s(X_v, Y_v) = |\nabla_θ L_θ(X_v, Y_v)| \qquad \text{Equation (2)}$$

A higher norm of the gradient signifies a greater inefficiency of the respective parameter in prediction of $D_{edit}$ samples. Consequently, each element of $s(X_v, Y_v)$ quantifies the sub-optimality of individual parameters. The output of the parameter saliency component 210 may be a gradient value for each parameter of the LLM. The gradient values may be stored in a table format, where an individual table may correspond to an individual layer of the LLM, an individual column may correspond to an individual node of the layer, and values within the column may correspond to the parameters of the node.

The column saliency component 220 may determine the column-wise saliency values by combining the parameter-wise saliency values within a column that correspond to a node. In example embodiments, the column saliency component 220 may determine the column-wise saliency value by determining an average (or mean, median, mode) of the parameter-wise saliency values in the column. The output of the column saliency component 220 may be individual saliency values corresponding to individual columns/nodes of a layer.

For example, the column wise saliency values may be computed by taking the average of given parameter-wise saliency profiles considering all p column's elements in each of the column in a layer of the network:

$$s_c(X_v, Y_v) = \frac{1}{p} \sum_{i=0}^{i=p} s(X_v, Y_v)i \qquad \text{Equation (3)}$$

The $s_c(X_v, Y_v)$ quantifies the sub-optimality of the column/node in a layer. The higher $s_c(X_v, Y_v)$ signifies its saliency to predict the undesired response.

The layer saliency component 230 may be configured to determine layer-wise saliency values by combining the column-wise saliency values. In example embodiments, the layer saliency component 230 may determine an average (or mean, median, mode) of the column-wise saliency values for a layer/table. For example, the layer saliency component 230 may use the following equation:

$$s_l(X_v, Y_v) = \frac{1}{m} \sum_{j=0}^{j=m} s_c(X_v, Y_v)j \qquad \text{Equation (4)}$$

Thus, the layer saliency component 230 may determine layer saliency values for individual layers of the LLM. Then the layer saliency component 230 may identify the salient layer responsible for causing output of the undesired response by selecting the layer with the highest layer saliency value. For example, the layer saliency component 230 may identify the salient layer by:

$$SL = \max(s_l(X_v, Y_v)_0^m) \qquad \text{Equation (5)}$$

In other example embodiments, the layer saliency component 230 may identify more than one salient layer. For example, the layer saliency component 230 may select salient layers associated with top-n (e.g., top 2, top 5, etc.) saliency values. As another example, the layer saliency component 230 may select a salient layer(s) based on the associated saliency value satisfying a threshold value. The layer saliency component 230 may output the salient layer identifier 142 corresponding to the selected salient layer(s).

In some embodiments, the techniques described herein are used to identify and edit a portion, different than a layer, of the LLM, for example, a node of the LLM. In such embodiments, the gradient values for the parameters of the node may be combined to determine a saliency value for the node, and one or more nodes may be identified as salient based on the corresponding saliency values. In some cases, the gradient values may be combined by determining an average of the gradient values, a weighted average of the gradient values, a median of the gradient values, a mean of the gradient values, etc.

After identifying the salient layer, the system 100 may update the LLM by only editing the salient layer. The model editor 150 may be configured to perform the updating/editing of the salient layer and the LLM.

Figure 4:
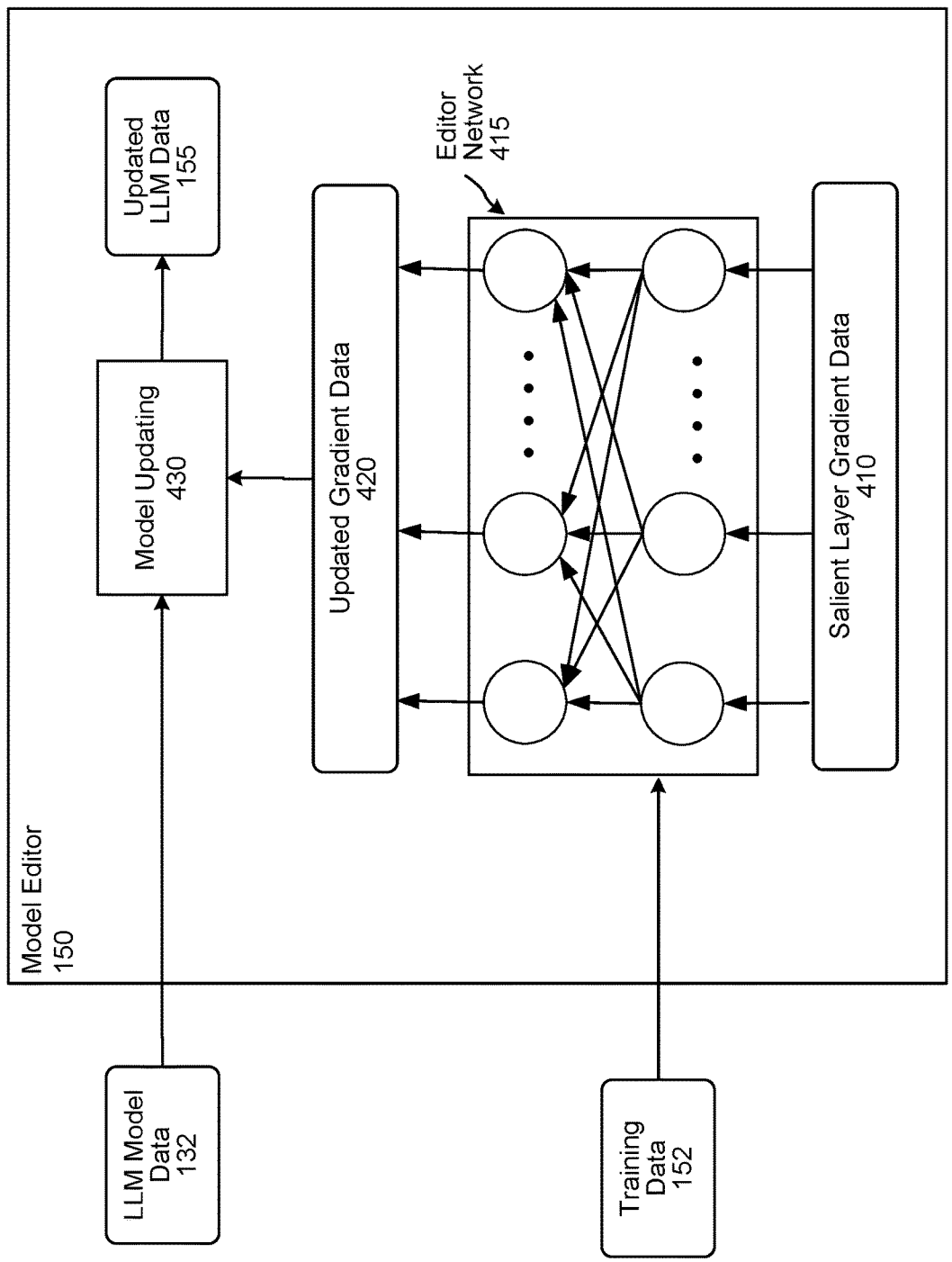
FIG. 4 is a conceptual diagram illustrating an example model editor component, according to embodiments of the present disclosure.

FIG. 4 illustrates example components of the model editor 150. Once the salient layer has been identified, the model editing process is performed by the model editor 150. Utilizing the base model $f_θ(\ )$ and an edit training set $D_{edit}$, a lightweight model editor network 415, designed to edit the weights of a specific layer, is trained. The editor network 415 when provided with new edit pairs ($x_e$, $y_e$) during testing, transform the fine-tuning gradient of the corresponding layer into a parameter update that aligns with the desired properties of correctness, consistency, and adaptiveness. The system may include multiple model editor networks 415, where each network 415 may edit an individual layer. For example, if multiple salient layer(s) (or portions) of the LLM are identified for editing, then they may be edited in parallel/substantially at the same time by using one model editor network 415 for one salient layer.

The editor network 415 may train or retrain the salient layer so that the parameters of the salient layer are modified from the initial salient layer gradient data 410 to updated gradient data 420 using training data that includes at a minimum an input-output pair of the given input and corresponding desired output (the data 134). The training data ($D_{edit}$), as described herein, may also include further pairs of inputs similar to the given input (similar input data 136) and the desired output (included in data 134). The training data, in some embodiments, may also include input-output pairs that the initial LLM was already generating desired outputs for.

In some embodiments, the editor network 415 may be a small neural network. In examples, the editor network 415 may be a multi-layer perceptrons model and may be a three-layer network. In example embodiments, the first layer of the editor network 415 may be the input layer, the second layer may be the hidden layer where training/learning of the model/layer occurs, and the last layer may be the output layer.

The editing network 415 may be trained to transform low-rank decomposition of gradients of filtered parameters (corresponding to the salient layer) to a tractable gradient. That is, the editing network 415 may process compressed gradients corresponding to the salient layer to determine updated/new gradients that can be used to update the parameters of the salient layer. In some embodiments, the gradients of the parameters of the salient layer may be compressed using a compression technique.

The editor network 415 may leverage a rank-1 fine-tuning gradient $\nabla_{W_l} L_\theta(x_e, y_e)$ (included in the salient layer gradient data 410) at layer l as input and outputs the parameter edits for that layer, $\nabla_{W_l}$—updated gradient data 420. For each of the batch element i, the gradient $\nabla_{W_l}$ can be given as:

$$\nabla_{W_l} L = \sum_{i=1}^{i=b} \delta_{l+1}^i u_l^{iT} \qquad \text{Equation (6)}$$

here, $\delta_{l+1}{}^i$ represents the gradient of the loss with respect to the pre-activations at layer l+1, while $u_l{}^i$ corresponds to the inputs to layer l. For simplicity, the sequence index may be merged with the batch index without loss of generality. Such decomposition allows a network to directly condition on the gradient of a single example using only 2d input neurons (rather than $d^2$). The editor network 415 may learn the parameter $\phi_l$ to map $u_l{}^i$ and $\delta_{l+1}{}^i$ to pseudo-activations $\tilde{u}_l{}^i$ and pseudodelta $\tilde{\delta}_{l+1}{}^i$. The model edit for the weight matrix $W_l$ is then computed as:

$$\tilde{\nabla}_{W_l} L = \sum_{i=1}^{i=b} \tilde{\delta}_{l+1}^i \tilde{u}_l^{iT} \qquad \text{Equation (7)}$$

For each unique weight matrix $W_l$ shape to be edited, a distinct set of editor parameters may be learned. The model editor 150 may incorporate a layer-specific scaling $s_l$ and offset $o_l$ to the editor network's hidden state and output. Hence, it computes for the edited layer $e_l(z_l)$, where $z_l$=concat($u_l$, $\delta_{l+1}$) as:

$$h_l = z_l + \sigma(s_l^1 \odot (U_1 V_1 z_l + b) + o_l^1) \qquad \text{Equation (8)}$$

$$e(z_l) = h_l + \sigma(s_{l2} \odot (U_2 V_2 h_l) + o_l^2) \qquad \text{Equation (9)}$$

For the gradient $\nabla_{W_l}$, $W_l \in W$, the editor network 415 may compute the parameter update as:

$$\tilde{W} = W_l - \alpha L \tilde{\nabla} W_l \qquad \text{Equation (10)}$$

This updated $\tilde{W}$ may be back-propagated into the editing network 415. The training losses $L_{corr}$, measuring correctness of edits and $L_{cons}$, measuring edit consistency with pre-edit model, can be formulated as follows: $L_{corr}$=$-\theta$ ($y_e|x_e$); $L_{cons}$=KL($p_\theta \tilde{W}(.|(x_e))||p_\theta W(.|x_r)$). A small value of $L_e$ may indicate that the model has effectively adjusted its output to accommodate the edit example's equivalence neighborhood, whereas a small $L_{loc}$ may suggest that the edit has not influenced the model's behavior on unrelated inputs. The overall loss to train the editor network 415 can be written as:

$$L_{e_l} = c_{corr} L_{corr\theta \tilde{W}} + L_{cons(\theta_W, \theta_{\tilde{W}})} \qquad \text{Equation (11)}$$

The model editor 150 may include a model updating component 430 that may determine an updated LLM model that generates desired responses to inputs, including the given input that was previously resulting in an undesired response. The model updating component 430 may receive the LLM model data 132. The model updating component 430 may also receive the updated gradient data 420 for the salient layer and may update the parameter values/weights of the salient layer using the updated gradient data 420. The model updating component 430 may generate the updated LLM data 155 based on the LLM model data 132 and the updated gradient data 420. For example, the model updating component 430 may update the weights of the salient layer in the LLM model data 132. As another example, the model updating component 430 may replace the original salient layer with the updated salient layer in the LLM model data 132 to generate the updated LLM data 155. In this manner, the model editor 150 may update the salient layer (the layer responsible for generating the undesired response) in the LLM to determine an updated LLM.

The techniques described herein can be used to update an LLM when an LLM output is an inappropriate output. An inappropriate output may include content that is harmful, offensive, incites violence, etc. The inappropriate output may include profanity, identity attacks, biased information, insults, threats, explicit content, hostile language, malicious language, language targeting a group of persons, etc.

To reduce/eliminate inappropriate outputs from the LLM, a salient layer corresponding to generation of the inappropriate output may be edited as described herein. In this case, the layer/model is edited using training data that includes pairs of input-desired output, where the desired output is an appropriate output (i.e., includes appropriate content that is unharmful, unoffensive, non-violent, etc.).

Editing of a salient layer can also increase robustness and reliability of the LLM, where the salient layer may be edited using training data that includes pairs of input-desired output, where the desired output may be a robust or reliable output for the input.

In some embodiments, similar techniques as described herein may be used to cause "unlearning" by a LLM and by a particular salient layer. The unlearning technique may be used to update the LLM when an undesired output may be biased or may correspond to privacy concerns.

A biased output may include content that corresponds to social stereotypes, unfair discrimination, exclusionary norms, etc. An output may present privacy concerns due to risks of exposing personal, confidential, sensitive information.

For unlearning, the system may identify the salient layer responsible for generating the undesired output, and the salient layer is updated to unlearn to remove biasness or preserve privacy in generation of outputs. For example, the salient layer may be updated using training data 152 that includes privacy revealing pairs of inputs-outputs, similar privacy revealing examples (similar inputs-similar outputs), and non-privacy revealing pairs of inputs-outputs. As another example, the salient layer may be updated using training data 152 that includes biased pairs of inputs-outputs, similar biased examples (similar inputs-similar outputs), and non-biased pairs of inputs-outputs.

Editing and unlearning may be different machine learning problems. In editing, the focus is to edit the model to drive it towards generating new feasible/desired responses per given input. In editing, the system may use desired/true outputs and undesired/wrong outputs to update the model weights. In unlearning, the model is modified to unlearn the privacy revealing information or the bias information. In unlearning, desired/new outputs may not be needed, and the model may be updated based on privacy revealing input-output pairs or biased input-output pairs (which may be included in the training data 152).

The loss functions for editing and unlearning may also be different. For example, for editing, the loss function may minimize a negative log likelihood loss ensuring true desired output generation for given input. As another example, for unlearning, the loss function may minimize a positive log likelihood loss deviating the generation of output from privacy revealing or bias generation.

Figure 5:
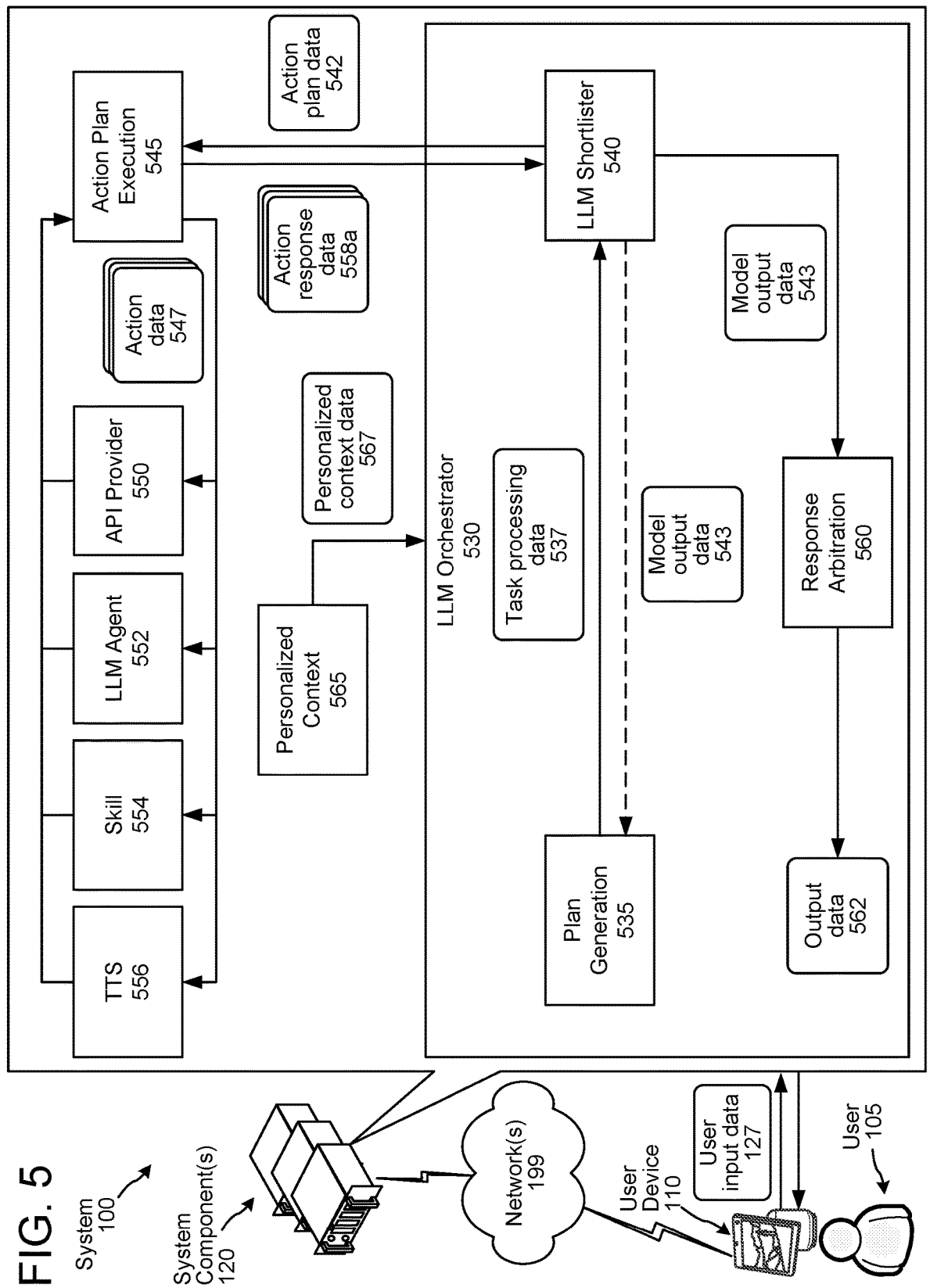
FIG. 5 is a conceptual diagram illustrating example components and processing for determining one or more components configured to perform an action associated with the task, according to embodiments of the present disclosure.

FIG. 5 illustrates a system 100 for using one or more language models to determine an action responsive to a user input. As shown in FIG. 5, the system may include a user device 110, local to a user 105, in communication with a system component(s) 120 via a network(s) 199. The network(s) 199 may include the Internet and/or any other wide- or local-area network, and may include wired, wireless, and/or cellular network hardware.

The system component(s) 120 may include various components, such as a large language model (LLM) orchestrator component 530, a personalized context component 565, an action plan execution component 545, an API provider component 550, an LLM agent component 552, a skill component 554, and a TTS component 556. The LLM orchestrator component 530 may include a plan generation component 535, an LLM shortlister component 540, and a response arbitration component 560. In some embodiments, the response arbitration component 560 may exist elsewhere in the system component(s) 120 outside of the LLM orchestrator component 530.

Language modeling (LM) is the use of various statistical and probabilistic techniques to determine the probability of a given sequence of words occurring in a sentence. Language models analyze bodies of text data to provide a basis for their word predictions. The language models are generative models. In some embodiments, the language models may be a LLM. An LLM is an advanced artificial intelligence system designed to process, understand, and generate human-like text based on massive amounts of data. An LLM model may be built using deep learning techniques, such as neural networks, and may be trained on extensive datasets that include text (or other type of data) from a broad range of sources, such as books and websites, for natural language processing. An LLM uses an expansive training dataset, as compared to a language model, and can include a large number of parameters (in the range of billions), hence, they are called "large" language models. In some embodiments one or more of the language models (and their corresponding operations, discussed herein below) may be the same language model.

In some embodiments where one or more of the language models are LLMs, the one or more language model may be transformer-based seq2seq models involving an encoder-decoder architecture. In an encoder-decoder architecture, the encoder may produce a representation of an input text using a bidirectional encoding, and the decoder may use that representation to perform some task. In some such embodiments, one or more of the language model may be a multilingual (approximately) 20 billion parameter seq2seq model that is pre-trained on a combination of denoising and Causal Language Model (CLM) tasks in various languages (e.g., English, French, German, Arabic, Hindi, Italian, Japanese, Spanish, etc.), and the language model [ref #] may be pre-trained for approximately 1 trillion tokens. Being trained on CLM tasks, the one or more language models may be capable of in-context learning. An example of such a LLM is Alexa Teacher Model (Alexa™).

In other embodiments, where one or more of the language models are an LLM, the one or more language models may be a decoder-only architecture. The decoder-only architecture may use left-to-right (unidirectional) encoding of the input text. An example of such a LLM is the Generative Pre-trained Transformer 3 (GPT-3) and other versions of GPT. GPT-3 has a capacity of (approximately) 175 billion machine learning parameters.

Other examples of LLMs include BigScience Large Open-science Open-access Multilingual Language Model (BLOOM), Language Model for Dialogue Applications model (LaMDA), Bard, Large Language Model Meta AI (LLaMA), Titan Foundational Model, etc.

In some embodiments, the system may include one or more machine learning model(s) other than one or more of the language models. Such machine learning model(s) may receive text and/or other types of data as inputs, and may output text and/or other types of data. Such model(s) may be neural network-based models, deep learning models, classifier models, autoregressive models, seq2seq models, etc.

In embodiments where one or more of the language models are an LLM, the input to the LLM may be in the form of a prompt. A prompt may be a natural language input, for example, an instruction, for the LLM to generate an output according to the prompt. The output generated by the LLM may be a natural language output responsive to the prompt. The prompt and the output may be text in a particular language (e.g., English, Spanish, German, etc.). For example, for an example prompt "how do I cook rice?", the LLM may output a recipe (e.g., a step-by-step process) to cook rice. As another example, for an example prompt "I am hungry. What restaurants in the area are open?", the LLM may output a list of restaurants near the user that are open at the time.

The language models may be configured using various learning techniques. For example, in some embodiments, the language models may be configured using few-shot learning. In few-shot learning, the model learns how to learn to solve the given problem. In this approach, the model is provided with a limited number of examples (i.e., "few shots") from the new task, and the model uses this information to adapt and perform well on that task. Few-shot learning may require fewer amount of training data than implementing other fine-tuning techniques. For further example, in some embodiments, the language models may be configured using one-shot learning, which is similar to few-shot learning, except the model is provided with a single example. As another example, in some embodiments, the language models may be configured using zero-shot learning. In zero-shot learning, the model solves the given problem without examples of how to solve the specific/similar problem and just based on the model's training dataset. In this approach, the model is provided with data sampled from a class not observed during training, and the model learns to classify the data.

In some embodiments, the LLM orchestrator component 530 may generate prompt data representing a prompt for input to the language models. As shown in FIG. 5, the system component(s) 120 receive user input data 127, which may be provided to the LLM orchestrator component 530. In some instances, the user input data 127 may correspond to a text or tokenized representation of a user input. For example, the user input data may include input text (or tokenized) data when the user input is a typed natural language user input. For further example, prior to the LLM orchestrator component 530 receiving the user input data 127, another component (e.g., an automatic speech recognition (ASR) component 950) of the system 100 may receive audio data representing the user input. The ASR component 950 may perform ASR processing on the audio data to determine ASR data corresponding to the user input, which may correspond to a transcript of the user input. As described below, with respect to FIG. 9, the ASR component 950 may determine ASR data that includes an ASR N-best list including multiple ASR hypotheses and corresponding confidence scores representing what the user may have said. The ASR hypotheses may include text data, token data, ASR confidence score, etc. as representing the input utterance. The confidence score of each ASR hypothesis may indicate the ASR component's 950 level of confidence that the corresponding hypothesis represents what the user said. The ASR component 950 may also determine token scores corresponding to each token/word of the ASR hypothesis, where the token score indicates the ASR component's 950 level of confidence that the respective token/word was spoken by the user. The token scores may be identified as an entity score when the corresponding token relates to an entity. In some instances, the user input data 127 may include a top scoring ASR hypothesis of the ASR data. As an even further example, in some embodiments, the user input may correspond to an actuation of a physical button, data representing selection of a button displayed on a graphical user interface (GUI), image data of a gesture user input, combination of different types of user inputs (e.g., gesture and button actuation), etc. In such embodiments, the system 100 may include one or more components configured to process such user inputs to generate the text or tokenized representation of the user input (e.g., the user input data 127).

In some embodiments, the LLM orchestrator component 530 may receive input data, which may be processed in a similar manner as the user input data 127 as described herein. The input data may be received in response to detection of an event such as change in device state (e.g., front door opening, garage door opening, TV turned off, etc.), occurrence of an acoustic event (e.g., baby crying, appliance beeping, etc.), presence of a user (e.g., a user approaching the device 110, a user entering the home, etc.). In some embodiments, the system 100 may process the input data and generate a response/output. For example, the input data may be received in response to detection of a user generally or a particular user, an expiration of a timer, a time of day, detection of a change in the weather, a device state change, etc. In some embodiments, the input data may include data corresponding to the event, such as sensor data (e.g., image data, audio data, proximity sensor data, short-range wireless signal data, etc.), a description associated with the timer, the time of day, a description of the change in weather, an indication of the device state that changed, etc. The system 100 may include one or more components configured to process the input data to generate a natural language representation of the input data. The system 100 may process the input data and may perform an action. For example, in response to detecting a garage door opening, the system 100 may cause garage lights to turn on, living room lights to turn on, etc. As another example, in response to detecting an oven beeping, the system 100 may cause a device 110 (e.g., a smartphone, a smart speaker, etc.) to present an alert to the user. The LLM orchestrator 530 may process the input data to generate tasks that may cause the foregoing example actions to be performed.

The user input data 127 may be received at the LLM orchestrator component 530 of the system component(s) 120, which may be configured to generate a list (e.g., one or more) of tasks (e.g., steps/actions) that are to be completed in order to perform an action responsive to the user input and select a task of the list of the tasks that is to be completed first (e.g., in a current iteration of processing by the system 100), as described in detail herein below with respect to FIG. 6. In instances where the plan generation component 535 generates more than one task to be completed in order to perform the action responsive to the user input, the plan generation component 535 may further maintain and prioritize the list of tasks as the processing of the system 100 with respect to the user input is performed. In other words, as the system 100 processes to complete the list of tasks, the plan generation component 535 may (1) incorporate the results of the processing performed to complete the tasks into data provided to other components of the system 100; (2) update the list of tasks to indicate completed (or attempted, in-progress, etc.) tasks; (3) generate an updated prioritization of the tasks remaining to be completed (or tasks to be attempted again); and/or (4) determine an updated current task to be completed. The plan generation component 535 may generate and send task processing data 537 representing the selected task to be completed and various other information needed to perform further processing with respect to the task (e.g., the user input data 127, an indication of the selected task, results of processing performed for previous tasks, the remaining task(s), and context data associated with the user input data 127, as described in detail herein below with respect to FIG. 6) to the LLM shortlister component 540.

The LLM shortlister component 540 may be configured to determine one or more components (e.g., APIs, skill component(s) 554, LLM agent component(s) 552, TTS component 556, etc.) configured to perform an action related to the user input or the current task. The LLM shortlister component 540 may further be configured to generate and cause the execution of a request(s) (e.g., an API call(s)) for the one or more components to provide an output(s) such as a description(s) representing the action the components are configured to/will perform with respect to the user input or the current task., Such requests may be represented in the action plan data 542 sent to the action plan execution component 545. The action plan execution component 545 may identify the request(s) in the action plan data 542 and cause the corresponding components (e.g., the API provider component 550, the LLM agent component 552, the skill component 554, and/or the TTS component 556) to generate action response data 558*a-n* representing the requested output(s). where individual action response data 558*a* may be provided by/correspond to a particular responding component—one of the API provider component 550, the LLM agent component 552, the skill component 554, and/or the TTS component 556. In some embodiments, the action response data 558 may include an identifier (e.g., a component name, an alphanumerical value associated with the component, etc.) for the component providing the data. The LLM shortlister component 540 receives and processes the action response data 558*a-n* and generates model output data 543 representing the output(s) (e.g., relevant outputs, selected outputs, ranked outputs, etc.) for further processing (e.g., as described in detail herein below with respect to FIG. 7). If the LLM shortlister component 540 determines that there are no remaining tasks to be completed, the LLM shortlister component 540 may send the model output data 543 to the response arbitration component 560.

The response arbitration component 560 processes the model output data 543 to determine whether completion of the one or more tasks by the system 100 results in performance of the action responsive to the user input. In other words, the response arbitration component 560 processes the model output data 543 (representing the actions to be performed in response to the user input) and (1) selects one or more of the actions to be output to the user; (2) generates a natural language summary of one or more of the actions; and/or (3) determines that none of the actions are responsive to the user input. For example, the response arbitration component 560 may process the model output data 543 to determine if one or more of the actions performable by the API(s) (e.g., represented by the natural language descriptions) are responsive to the current task. If the response arbitration component 560 determines that none of the actions are responsive to the user input, then the response arbitration component 560 may send an instruction to the personalized context component 565 to generate clarifying information (e.g., personalized context data 567) for the user input. Additionally, or alternatively, the response arbitration component 560 may generate a natural language question to be output to the user requesting the clarifying information. In such instances, the system 100 (e.g., the plan generation component 535, the LLM shortlister component 540, and/or the response arbitration component 560) may process as described herein with further respect to the clarifying information (e.g., the personalized context data 567 and/or the user-provided clarifying information) to perform the action responsive to the user input.

Figure 6:
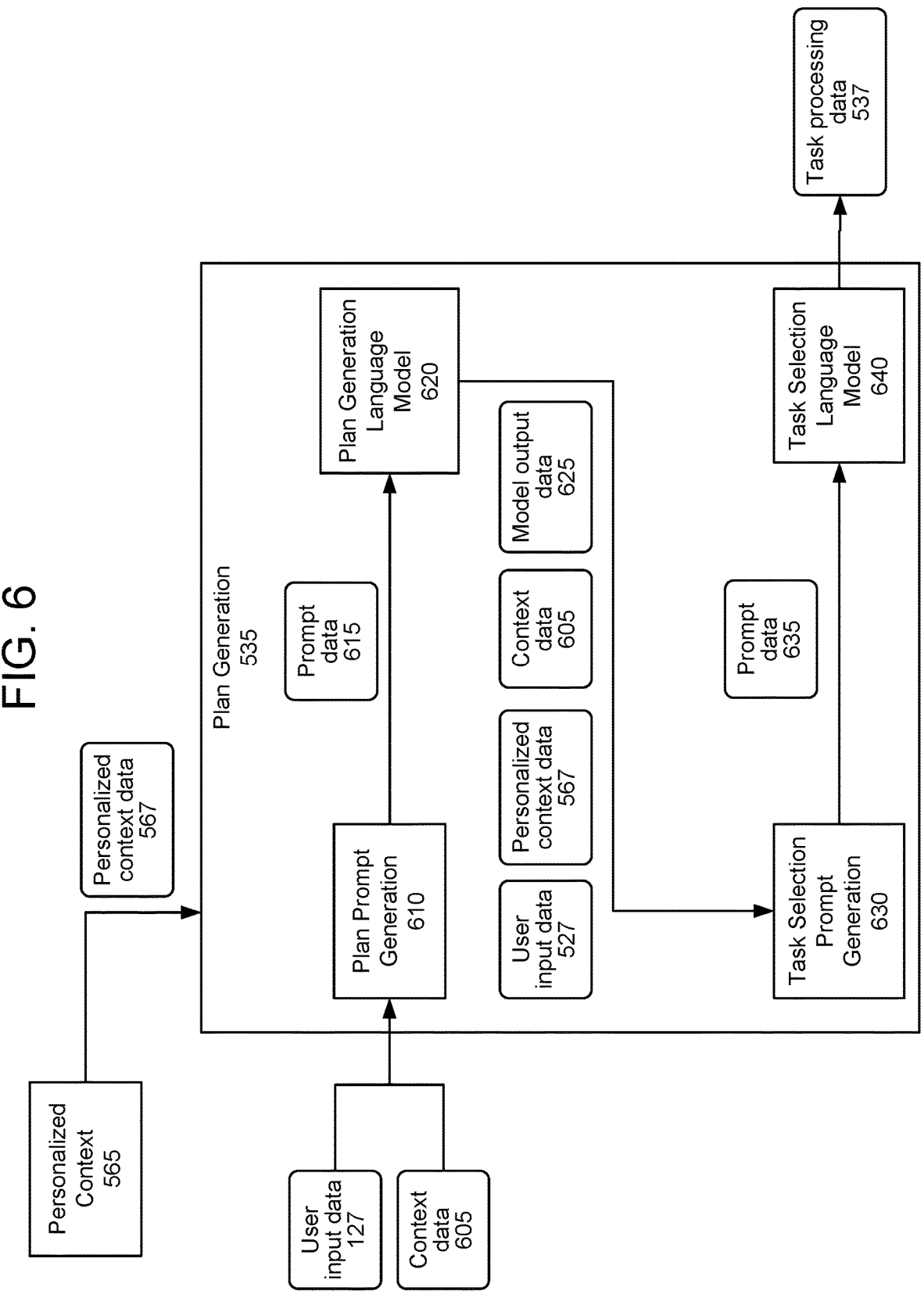
FIG. 6 is a conceptual diagram illustrating example components and processing of a plan generation component, according to embodiments of the present disclosure.

FIG. 6 illustrates example processing of the plan generation component 535. As shown in FIG. 6, the plan generation component 535 may include a plan prompt generation component 610, a plan generation language model 620, a task selection prompt generation component 630, and a task selection language model 640.

As further shown in FIG. 6, the user input data 127 is received at the plan prompt generation component 610. The plan prompt generation component 610 processes the user input data 127 to generate prompt data 615 representing a prompt for input to the plan generation language model 620. In some embodiments, the plan prompt generation component 610 may further receive an indication of one or more remaining tasks to be completed with respect to the user input data 127. For example, if the current iteration of processing with respect to the user input data 127 is a subsequent iteration of processing (e.g., the system previously determined that more than one task is to be completed in order to perform an action responsive to the user input data 127 and has previously performed at least a first task of the more than one tasks), then the plan prompt generation component 610 may further receive an indication of the remaining tasks to be completed. In such embodiments, the plan prompt generation component 610 may further receive an indication of the completed task(s) and/or result(s) of the processing performed to complete the task(s). The plan prompt generation component 610 may further receive context data 605 representing various contextual signals associated with the user input data 127, such as weather information, time of day, device information associated with the device that sent the user input data 127 (e.g., device ID, device states, historical device interaction data, etc.). Such prompt data 615 may be generated based on combining the user input data 127 and the context data 605 (and, in some embodiments, the indication of the remaining task(s), completed task(s), and/or the results of the processing performed to complete the task(s)). In some embodiments, the prompt data 615 may be generated further based on personalized context data 567 representing one or more contextual signals associated with a user that provided the user input, such as information associated with a user profile of the user (e.g., user ID, user behavioral information, user preferences, age, gender, historical user interaction data, devices associated with the user profile, etc.), which may be determined using, for example, a user recognition component 995. In some embodiments, an indication of the user and/or user profile may be included in the user input data 127 (e.g., as included in the output of the ASR component 950.). In some embodiments, the personalized context data 567 may include dialog history data representing one or more user inputs and corresponding system-generated responses for a current interaction between the user and the system 100.

As used herein, a "dialog" may refer to multiple related user inputs and system 100 outputs (e.g., through user device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The plan prompt generation component 610 may receive the personalized context data 567 from a personalized context component 565. The personalized context component 565 may be configured to determine and return contextual information associated with a user input to the plan prompt generation component 610, which the plan prompt generation component 610 may combine with the user input data 127 to generate the prompt data 615. In some embodiments, the personalized context component 565 may query various components and/or storages (e.g., the profile storage 970) for the contextual information. In some embodiments, the personalized context component 565 may include a storage including one or more portions of the contextual information. In other embodiments, the personalized context component 565 may be/implement an LLM. In such embodiments, the personalized context component 565 may be finetuned on personalized information for one or more users, as is discussed in more detail herein below. Further, in such embodiments, the personalized context component 565 (or the system 100) may include a personalized context prompt generation component (not illustrated), which may be configured to generate a prompt including the user input data 127 (or a representation of an intent of the user input) to be input to the LLM. The prompt may be an instruction for the LLM to determine one or more portions of context data (e.g., the personalized context data 567) associated with the prompt.

The personalized context component 565 may be caused to generate and return the personalized context data 567 based on the system 100 determining that clarifying information is needed in order to complete a task associated with a user input. For example, one or more of the components of the system 100 (e.g., the plan generation language model 620, the task selection language model 640, the shortlister language model 740, the response arbitration component 560) may determine that an ambiguity exists in the user input (or the data determined/generated as a result of processing with respect to the user input). In such examples, the personalized context component 565 may receive the user input, the current task, and/or model output data indicating that an ambiguity exists/clarifying information should be determined (e.g., model output data representing "Does the user prefer to use [Music Streaming Service 1] or [Music Streaming Service 2] for playing music," "I need to determine whether the user prefers [Music Streaming Service 1] or [Music Streaming Service 2] for playing music" or the like). The personalized context component 565 may process as described herein above to generate the personalized context data 567 (e.g., "The user prefers [Music Streaming Service 1].")

In some embodiments, plan prompt generation component 610 (or another component of the system 100) may process the context data 605, the personalized context data 567, the user input data 127, and/or the result of processing performed to complete a task associated with the user input data 127 to generate a natural language representation of the user input (represented by the user input data 127) that is updated to include the contextual information of the personalized context data 567 (e.g., a contextual rewrite of the user input). Thereafter, the plan prompt generation component 610 may process to generate the prompt data 615 using the updated user input data.

In some embodiments, the prompt data 615 may be an instruction for the plan generation language model 620 to determine one or more tasks (e.g., steps/actions) that are to be completed in order to perform an action responsive to the user input given the other information (e.g., the personalized context data 567, the indication of the remaining task(s), the indication of the completed task(s), and/or the corresponding response(s)) included in the prompt data 615.

In some embodiments, the plan prompt generation component 610 may also include in the prompt data 615 a sample processing format to be used by the plan generation language model 620 when processing the prompt. In some embodiments, the plan prompt generation component 610 may generate the prompt data 615 according to a template format. For example, the prompt data 615 may adhere to a template format of:

{
Create a new task if necessary to help complete a request to [user input data 127 (or a representation of a determined intent of the user input data 127].
Here are the completed tasks, their results, user inputs, and context so far:
[completed tasks, results of processing performed to complete the tasks, dialog history, context data 605, personalized context data 567]
These are the remaining tasks to be completed:
[remaining task data]
Based on the result, create new tasks to be completed, if necessary.
Return the tasks as an array.
}

In some embodiments, the template format may instruct the plan generation language model 620 as to how it should process to generate the one or more tasks (e.g., steps) that are to be completed in order to perform the action responsive to the user input. In some embodiments, the format may further include an indication, such as a label of "User:" indicating the following string of characters/tokens as the user input. In some embodiments, the format may further include a label of "Thought:" instructing the plan generation language model 620 to generate an output representing the determined interpretation of the user input by the plan generation language model 620 and/or an action that should be taken (e.g., the user is requesting [intent of the user input], the user is trying to [intent of the user input], need to determine [information needed to properly process the user input] etc.) In some embodiments, the format may further include an indication of "Observation:" indicating the following string of characters/tokens as the result of performance of an action determined by the plan generation language model 620/the plan generation language model 620's interpretation of the result of the performance of the action determined by the plan generation language model 620 (e.g., the completed tasks and/or their results). In some embodiments, the format may further include an indication of "Response:" instructing the plan generation language model 620 to generate a response (e.g., one or more tasks to be completed to perform an action responsive to the user input) to the prompt.

Following such a template format, for example, and for a user input of "turn on all of the lights except the garage," the plan prompt generation component 610 may generate example prompt data 615a:

{
Create a new task if necessary to help complete a request to turn on all of the lights except the garage.
Here are the completed tasks, their results, user inputs, and context so far:
[ ]
These are the remaining tasks to be completed:
[ ]
Based on the result, create new tasks to be completed, if necessary.
Return the tasks as an array.
}

As an example of a user input that is associated with more than one task, the system 100 may receive a user input of "please order some pizza for dinner" and may determine a task list of "identify user pizza preference" and "find application that enables ordering of pizza." Thereafter, the system 100 may process as described herein below to select and complete the task of "identify user pizza preference." The plan prompt generation component 610 may process the user input, corresponding context data, the remaining task list, and results of processing performed with respect to previous tasks (e.g., the users pizza preference, determined, for example, by the personalized context component 565) to generate example prompt data 615a:

{
Create a new task if necessary to help complete a request to order some pizza for dinner.
Here are the completed tasks, their results, user inputs, and context so far:
Completed tasks:
  Identify user pizza preference: user ordered Brooklyn style pizza from [Company name]
These are the remaining tasks to be completed:
Find application to order pizza
Based on the result, create new tasks to be completed, if necessary.
Return the tasks as an array.
}

In some embodiments, the plan prompt generation component 610 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 615 may include "Please generate a polite, respectful, and safe response and one that does not violate protected class policy."

The plan generation language model 620 processes the prompt data 615 to generate model output data 625 representing one or more predicted tasks to be completed in order to perform the action responsive to the user input. For example, based on processing the first example prompt data provided above, the plan generation language model 620 may output model output data: {"turn on all of the lights except the garage light,"} or the like. For further example, as discussed above, based on processing prompt data corresponding to the user input "please order some pizza for dinner" the plan generation language model 620 may output model output data: {"identify user pizza preference;" "find application that enables ordering of pizza," or the like. After the first task of "identify user pizza preference" is complete, and based on processing the second example prompt data provided above, the plan generation language model 620 may further output model output data: {"find an application to order pizza" "find API to order [Company name] pizza,"} or the like. In some embodiments, the threshold for determining the one or more tasks may be such that the plan generation language model 620 is encouraged to generate multiple predicted tasks for a given user input, where the system 100 may parse and filter the list of tasks during downstream processing (e.g., during the processing of the task selection language model 640). For example, based on processing the first example prompt data provided above, the plan generation language model 620 may output model output data: {"turn on all of the lights except the garage light," "turn on all lights," "identify which garage light," "turn on all lights then turn off garage light," "turn on all lights where user is located," "turn on kitchen lights, living room lights, dining room lights, hallways lights" "turn on all lights on first floor,"} or the like.

The model output data 625 is sent to the task selection prompt generation component 630, which processes the model output data 625 to generate prompt data 635 representing a prompt for input to the task selection language model 640. In some embodiments, such prompt data 635 may be generated based on combining the user input data 127, the context data 605, the personalized context data 567, the prompt data 615, and/or the model output data 625. In some embodiments, the plan generation component 535 may include another component that parses the model output data 625 to determine the one or more tasks and may send a representation of the one or more tasks to the task selection prompt generation component 630.

In some embodiments, the prompt data 635 may be an instruction for the task selection language model 640 to select a task of the one or more tasks that is to be completed first (e.g., completed during the current iteration of processing) given the information (e.g., user input data 127, the personalized context data 567, and the one or more tasks) included in the prompt data 635. In some embodiments, the prompt data 635 may further include an instruction for the task selection language model 640 to determine a priority of the one or more tasks (e.g., an ordered list representing the order in which the one or more tasks are to be completed). As discussed above, with respect to the plan prompt generation component 610, in some embodiments, the task selection prompt generation component 630 may also include in the prompt data 635 a sample processing format to be used by the task selection language model 640 when processing the prompt. Similarly, in some embodiments, the task selection prompt generation component 630 may generate the prompt data 635 according to a template format, such as:

{
Select the top prioritized task given the ultimate goal of [user input data 127 (or a representation of a determined intent included in the user input data 127]
Here are the completed tasks, their results, and user inputs so far: [completed tasks, results of processing performed to complete the tasks, dialog history, context data 605, personalized context data 567]
Here are the task candidates:
[remaining tasks]
Return your selected task, return None if the goal is achieved or indicate existing ambiguities.
}

In some embodiments, the template format may instruct the task selection language model 640 as to how it should process to select the task and/or prioritize the one or more tasks. In some embodiments, as discussed above, the format may further include indications of the "User:", "Thought:", "Action:", "Observation:", and/or "Response:" indicators.

Following such a template format, for example, and for the first example user input provided above of "turn on all of the lights except the garage," the task selection prompt generation component 630 may generate example prompt data 635a:
{
Select the top prioritized task given the ultimate goal of turn on all of the lights except the garage
Here are the completed tasks, their results, user inputs, and context so far:
[ ]
Here are the task candidates:
Turn on all of the lights except the garage light
Return your selected task, return None if the goal is achieved or indicate existing ambiguities.
}
For further example, for the second example user input provided above of "please order some pizza for dinner," the task selection prompt generation component 630 may generate example prompt data 635a:
{
Select the top prioritized task given the ultimate goal of please order some pizza for dinner
Here are the completed tasks, their results, user inputs and context so far:
Completed tasks:
  Identify user pizza preference: user ordered Brooklyn style pizza from [Company name]
Here are the task candidates:
find an application that sells pizza
find API that sells [Company name] pizza
Return your selected task, return None if the goal is achieved or indicate existing ambiguities.
}
In some embodiments, the task selection prompt generation component 630 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The task selection language model 640 processes the prompt data 635 to generate model output data representing the task to be completed first and/or a prioritization of the one or more tasks. For example, based on processing the first example prompt data provided above, the task selection language model 640 may output model output data: {"1. Turn on all of the lights except the garage light,"} or the like. For further example, based on processing the second example prompt data provided above, the task selection language model 640 may output model output data: {"1. Find an API that sells [Company name] pizza,"} or the like. In some embodiments, during processing of the task selection language model 640 to select and/or prioritize the one or more tasks, the task selection language model 640 may update the task list to remove any redundant and/or conflicting tasks. For example, for the second example prompt data, the task selection language model 640 may determine that the remaining tasks of "find an application that sells pizza" and "find an API that sells [Company name] pizza" are redundant, and that "find an API that sells [Company name] pizza has a higher priority. Therefore, the task selection language model 640 may remove the task of "find an application that sells pizza" from the remaining task list. Thereafter, the plan generation component 535 (or another component of the plan generation component 535) may process the model output data of the task selection language model 640 to determine task processing data 537 representing the user input data 127, the context data 605, the personalized context data 567, and/or the task selected by the task selection language model 640 to be completed first. In some embodiments, the task processing data 537 may include the remaining one or more tasks and/or may indicate the prioritization of the one or more tasks, as determined by the task selection language model 640. The task processing data 537 may be sent to the LLM shortlister component 540, which is described in detail herein below with respect to FIG. 7.

Figure 7:
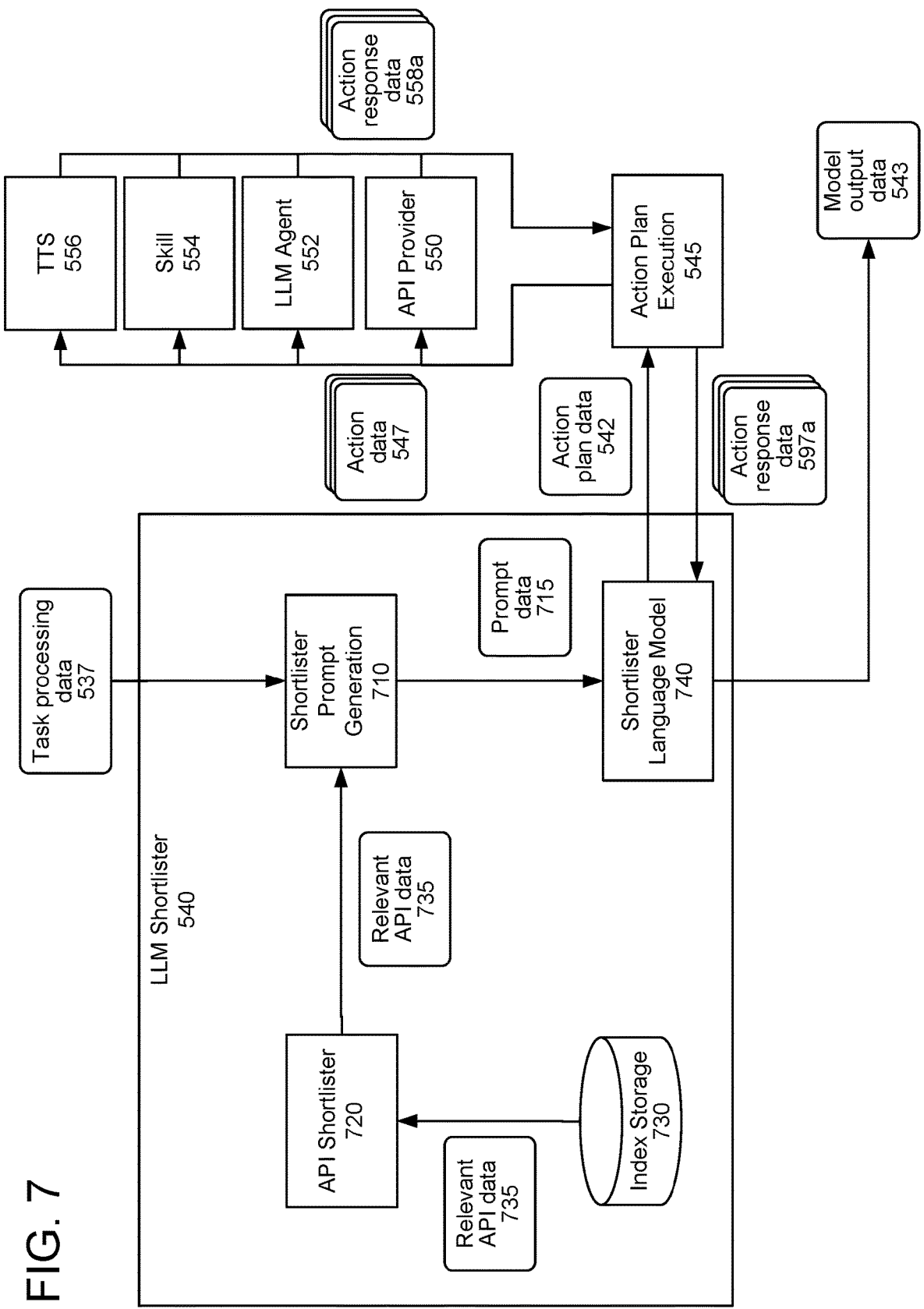
FIG. 7 is a conceptual diagram illustrating example components and processing of an LLM shortlister, according to embodiments of the present disclosure.

FIG. 7 illustrates example processing of the LLM shortlister component 540. As shown in FIG. 7, the LLM shortlister component 540 may include an index storage 730, an API shortlister component 720, a shortlister prompt generation component 710, and a shortlister language model 740.

As further shown in FIG. 7, the task processing data 537 is received at the shortlister prompt generation component 710. The shortlister prompt generation component 710 processes the task processing data 537 to generate prompt data 715 representing a prompt for input to the shortlister language model 740. In some embodiments, such prompt data 715 may be generated based on combining the task processing data 537 (e.g., the user input data 127, the selected task, remaining tasks, results from processing performed to complete one or more previous tasks, etc.) and relevant API data 735 representing one or more APIs associated with the user input data 127 and/or the current task.

The relevant API data 735 may be generated by the API shortlister component 720, which may be configured to retrieve one or more (e.g., top-k) relevant APIs associated with the user input data 127 or the current task. In some embodiments, the APIs may correspond to various components. For example, the components may correspond to rule-based components, ML-based components, LLM-based components, or the like, such as personalized context component 565, skill component(s) 554, LLM agent component(s) 552, TTS component 556, orchestrator component 930, etc.) In some embodiments, the APIs may correspond to the components.

The API shortlister component 720 may use retrieval-based approaches to retrieve the one or more relevant APIs from the index storage 730, which may store various information associated with multiple APIs such as API descriptions, API arguments (e.g., parameter inputs/outputs), identifiers for components (e.g., such as personalized context component 565, skill component(s) 554, LLM agent component(s) 552, TTS component 556) that provides the API, etc. For example, the API shortlister component 720 may compare one or more APIs included in the index storage 730 to the user input or the current task to determine one or more APIs (top-k) that corresponds to the user input or the current task (e.g., APIs that are semantically similar to the user input or the current task, APIs that are capable of performing the current task, etc.). In some embodiments, the API shortlister component 720 (or another component of the API shortlister component 720) may determine an encoded representation of the user input or the current task and compare (e.g., using cosine similarity) the encoded representation(s) to an encoded representation of an API description for the API to determine whether the API is semantically similar to the user input or the current task. An API description may correspond to a description of the one or more actions that the API is configured to perform and/or other information associated with the API (e.g., an API call formatting structure (e.g., including input parameters), historical accuracy/defect rate, historical latency value, etc.). In some embodiments, the API description may further include one or more exemplars associated with use of the API (e.g., an example user input, corresponding API call, and example API output). If the value of semantic similarity meets or exceeds a threshold, the API (and, optionally, the API description) may be included in the relevant API data 735. In some embodiments, the API shortlister component 720 may determine the relevant API data 735 further using contextual information, including the context data 605, the personalized context data 567, an accuracy/defect rate value associated with the APIs, and/or a historical latency value associated with the APIs (e.g., which may be included in the description of the API). In some embodiments, the index storage 730 may be included in the API shortlister component 720. Similar processing may be performed to determine one or more components that are semantically similar to the user input or the current task, which may be included in the relevant API data 735. The API retrieval may send the relevant API data 735 to the shortlister prompt generation component 710.

In some embodiments, the prompt data 715 may be an instruction for the shortlister language model 740 to determine one or more APIs that are to process with respect to the user input or the current task (e.g., determine one or more API calls to cause the APIs to process) given the information (e.g., the user input data 127, the context data 605, the personalized context data 567, the current task, and the relevant API data 735). As discussed above, with respect to the plan prompt generation component 610 and the task selection prompt generation component 630, in some embodiments, the shortlister prompt generation component 710 may also include in the prompt data 715 a sample processing format to be used by the shortlister language model 740 when processing the prompt. Similarly, in some embodiments, the shortlister prompt generation component 710 may generate the prompt data 715 according to a template format, such as:

{
You are an AI agent to find and execute an API to complete the task of [Task]
Here are a list of relevant API available:
[relevant API]
Use the following format:
Thought: think about what to do
API: API calls compatible with the task
Observation: the result of the API call
Summary: summarized results from the API call
If no appropriate API is found, summarize as nothing is found.
}

Following such a template format, for example, and for a selected task of "turn on all of the lights except the garage light" and corresponding relevant API data, the shortlister prompt generation component 710 may generate example prompt data 715a:

{
You are an AI agent to find an execute an API to complete the task of turn on all of the lights except the garage light
Here are a list of relevant API available:
Let's chat API
Classic NLU API
Smart Home skill
Use the following format:
Thought: think about what to do
API: API calls compatible with the task Observation: the result of the API call
Summary: summarized results from the API call
If no appropriate API is found, summarize as nothing is found.
}

In some embodiments, the shortlister prompt generation component 710 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data may include "Please generate a polite, respectful, and safe response and one that does not violate protected class policy."

The shortlister language model 740 processes the prompt data 715 to generate one or more API calls corresponding to request(s) that the corresponding APIs return a description of an action(s) that the APIs are configured to/will perform with respect to the user input and/or the current task. As such, in some embodiments, the shortlister language model 740 may generate API calls for a subset of the APIs represented in the prompt data 715. The shortlister language model 740 may generate the one or more APIs calls (including the required input parameters) by applying in-context learning for cold-starting APIs (e.g., one-shot/few-shot learning). For example, in embodiments where the relevant API data 735 includes the API descriptions, the shortlister language model 740 may use the one or more exemplars included in the API descriptions (included in the prompt data 715) to determine the one or more input parameters for the API call. In some embodiments, the shortlister language model 740 may be finetuned on such exemplars (e.g., during offline or runtime processing), such that the shortlister language model 740 is capable of determining the one or more input parameters for the given API call.

During processing of the shortlister language model 740 and after generating the one or more API calls, the shortlister language model 740 may cause the one or more API calls to be executed. For example, as shown in FIG. 7, the shortlister language model 740 may send action plan data 542 representing the one or more API calls to the action plan execution component 545, which causes execution of the one or more API calls included in the action plan data 542. For example, the action plan execution component 545 may process the action plan data 542 to generate action data 547a-n. Action data 547a may represent, for example, an instruction (e.g., an API call determined from the action plan data 542) for a particular API to process with respect to the user input and/or the current task. In some embodiments, the action plan execution component 545 may generate the action data 547a-n to represent an instruction to provide the description of the action performable/to be performed with respect to the user input and/or the current task.

The action plan execution component 545 may send the action data 547a-n to the API provider component 550, the LLM agent component 552, the skill component 554, the TTS component 556, and/or the orchestrator component 930. The API provider component 550 may include one or more components (e.g., rule-based components, ML-based components, LLM-based components, or the like) that may be caused to process using the action data 547a-n (e.g., using the API calls generated by the LLM shortlister component 540).

As discussed herein above, the system 100 may include the TTS component 556, which may be configured to process textual or tokenized input to generate audio data representing synthesized speech corresponding to the textual or tokenized input spoken by a synthetic voice. The processing of the TTS component 556 is discussed in detail below with respect to FIG. 9.

The LLM agent component 552 may correspond to one or more LLM agents. An LLM agent component 552 may correspond to a custom instantiation of an LLM (and other components) that is configured to handle user inputs relating to a particular domain/functionality. In some embodiments, the LLM agent component 552 may be configured to handle specific use cases via particular prompt generation, fine-tuning of the LLM, etc. For example, the LLM agent component 552a may be configured to handle user inputs/tasks related to information query, the LLM agent component 552b may be configured handle user inputs/tasks related to shopping, the LLM agent component 552c may be configured to handle user inputs/tasks related to ordering food from various restaurants, the LLM agent component 552d may be configured to handle user inputs/tasks related to ordering food from a particular restaurant (e.g., a particular pizza restaurant), the LLM agent component 552e may be configured to handle user inputs/tasks related to booking a hotel, the LLM agent component 552f may be configured to handle user inputs/tasks related to booking a flight, etc.

The skill component 554 may be software running on the system component(s) 120 that is akin to a software application. That is, a skill component 554 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 554. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 554 may operate in conjunction between the system component(s) 120 and other devices, such as the user device 110, in order to complete certain functions. A skill component 554 may include hardware, software, firmware, or the like that may be dedicated to a particular skill component 554 or shared among different skill components 554.

As discussed above, the API provider component 550 may include various components that may be caused to execute using the action data 547a-n. For example, the API provider component 550 may include an entity recognition (ER) component, which may be configured to process textual or tokenized input to link one or more entity references included in the textual or tokenized input to a specific corresponding entity known to the system 100. For example, based on the textual or tokenized input (e.g., a context of the textual or tokenized input), the ER component may determine that a reference to "Neil Armstrong" is directed to the American astronaut. In some embodiments, the action data 547a-n may include an indication(s) (e.g., slots) of one or more entities included in the user input, as determined by one or more of the language models 620, 640, 740, in which case the ER component may process to link the one or more entities to the specific, referenced, entity known to the system 100.

In other embodiments, the ER component may be configured to process the action data 547a-n to determine the one or more entities included in the user input and link the one or more determined entities to the specific, referenced, entity (entities) known to the system 100. For example, the ER component may include one or more recognizers. Each recognizer may include a named entity recognition (NER) component. The NER component applies grammar information and lexical information (received from a storage) associated with a domain (associated with the recognizer implementing the NER component) to determine a mention of one or more entities in text data. In this manner, the NER component identifies "slots" (each corresponding to one or more particular words in text data) that may be useful for later processing. The NER component may also label each slot with a type (e.g., noun, place, city, artist name, song name, etc.). Thereafter, the ER component links a slot of text data to a specific entity known to the system. To perform entity resolution, the ER component may utilize gazetteer information stored in an entity library storage. The gazetteer information may be used to match text data (representing a portion of the user input) with text data representing known entities, such as song titles, contact names, etc. Gazetteers may be linked to users (e.g., a particular gazetteer may be associated with a specific user's music collection), may be linked to certain domains (e.g., a shopping domain, a music domain, a video domain, etc.), or may be organized in a variety of other ways.

For further example, the API provider component 550 may include a search component, which may be configured to query a storage (e.g., a database, repository, knowledge base, etc.) for information usable for generating a response to a user input. For example, if the action data 547a-n represents a request for information of "Who won the game between [Team 1 Name] and [Team 2 Name]," then the search component may query the storage (or other sources, such as the Internet), to retrieve the information "[Team 1 Name] won the game between [Team 1 Name] and [Team 2 Name].".

As an even further example, the API provider component 550 may include a device controller component, which may be configured to cause a device to perform an action corresponding to the action data 547a-n. For example, if the action represented by action data 547a is to turn on a living room light (e.g., "turn_on_device (device="living room light")), then the device controller component may identify the corresponding living room light, and instruct the living room light to power on (e.g., change its state to {state: ON}).

In some embodiments, the API provider component 550 may include a domain service component, which may be configured for interacting with one or more services defined by particular users, such as developers, specialists, or the like (e.g., to receive information, such as responses or annotations, to cause an action.

The API provider component 550, the LLM agent component 552, the skill component 554, and/or the TTS component 556 may send action response data 558a-n representing one or more responses generated by the one or more APIs corresponding to the action data 547a-n (e.g., the descriptions of the actions performable by the APIs with respect to the user input and/or the current task) to the action plan execution component 545. For example, in response to an API call to the skill component 554 associated with a user input for turning on a light, the action data 547a may correspond to "turn on the light," "turn_on_device ("light", [device ID])", or the like. For further example, in response to an API call to the skill component 554 associated with a user input for ordering a pizza from a particular restaurant, the action data 547b may correspond to "order medium pizza from [restaurant name]", "order_pizza ("medium", "pizza", "[restaurant name]")", or the like. The action plan execution component 545 may send the action response data 558a-n to the shortlister language model 740.

In some embodiments, the shortlister language model 740 may process the action response data 558a-n to generate a natural language summary of the action response data (e.g., the model output data 543). In some embodiments, the model output data 543 may include an association between action response data 558a (or a summarized representation of the action response data 558a) and an indication of the API/component that generated the action response data 558a (e.g., a component identifier, API description, etc.). In some embodiments, the shortlister language model 740 may be configured to filter and/or rank the action response data 597a-n based on how relevant the action response data 597a-n is to the current task. In some embodiments, the shortlister language model 740 may be configured to filter and/or rank the action response data 597a-n based on a confidence level of the component that provided the response data, where the confidence level may indicate a likelihood of the component being able to respond (e.g., within a period of time), the component being able to perform an action that corresponds to the current task, etc. In some embodiments, the action response data 597a-n may indicate whether or not the corresponding component is able to respond (e.g., the action response data 597a may include a Boolean value such as "yes" or "no" or other similar indications). In some embodiments, the shortlister language model 740 may filter and/or rank the action response data 597a-n based on information included in the prompt data 715 (e.g., the user input data 127, the relevant API data 735, the personalized context data 567, the prompt data 615, etc.) For example, the model output data 543 may include a subset of the response data 597a-n (or the summarized representations of the action response data 597a-n) and may further include a representation of a confidence associated with the action response data 597a (or a summarized representation of the response data 597a). As such, the model output data 543 may further include data representing a confidence of how relevant the action response data 597a is to the current task. In some embodiments, the shortlister language model 740 may consider a rating associated with the component that provided the action response data 597, where the rating may be a user satisfaction rating provided by multiple different users of the system 100, a user satisfaction rating provided by the user 105 associated with the user input data 127, a system generated rating based on the number of past tasks handled by the component, a accuracy rating based on the number of past tasks the component had handled correctly/provided a desired response for, etc.

Figure 8:
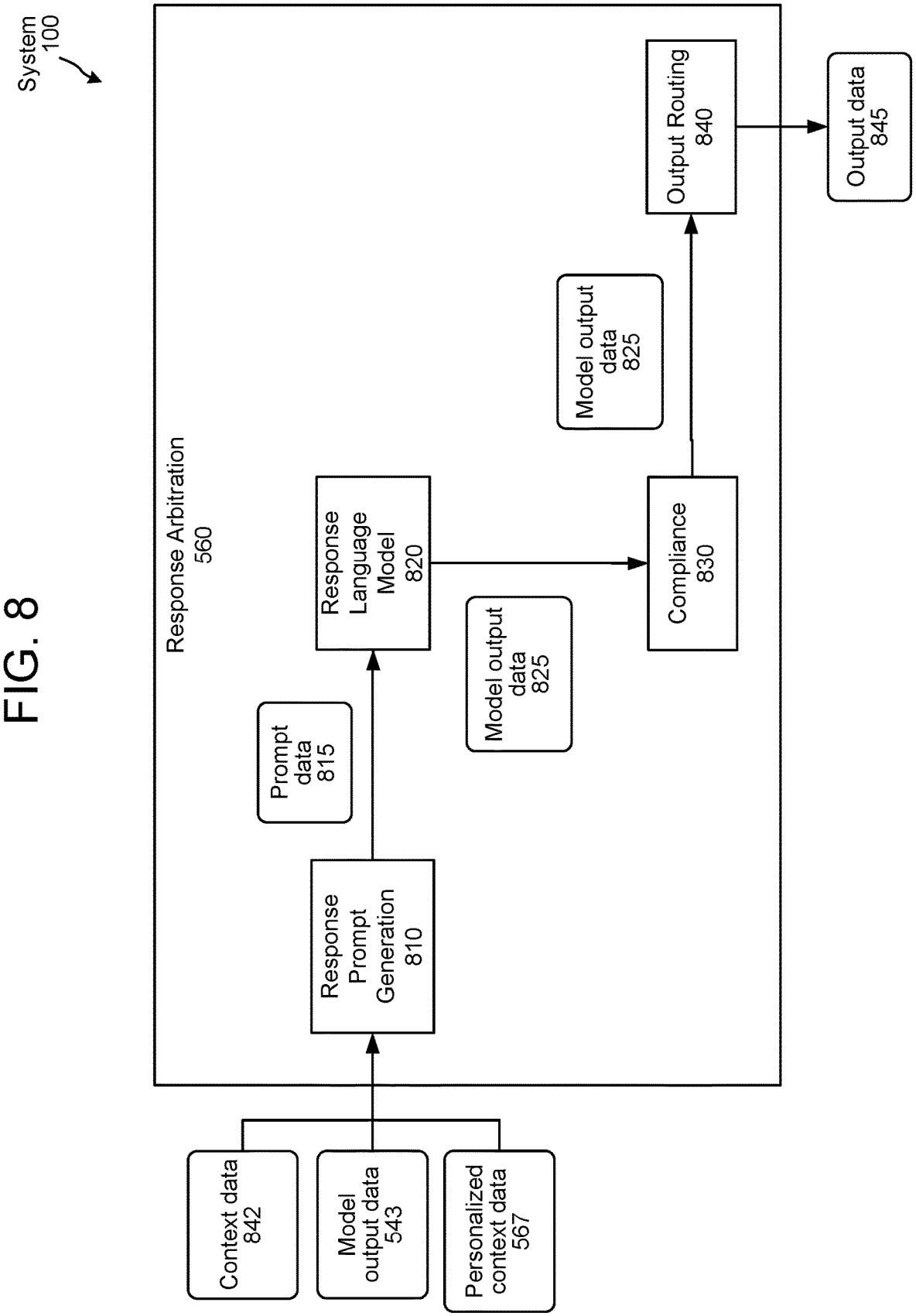
FIG. 8 is a conceptual diagram illustrating example component and processing of a response arbitration component, according to embodiments of the present disclosure.

The LLM shortlister component 540 may send the model output data 543 for further processing. In instances where the plan generation component 535 determined that more than one task is to be completed in order to perform the action responsive to the user input data 127, the LLM shortlister component 540 may send the model output data 543 to the plan generation component 535, which may process as described herein above to maintain and prioritize the task list based on the model output data 543 and select a new task to be completed. In instances where the plan generation component 535 determined that only one task is to be completed, or in instances where the LLM shortlister component 540 determines that there are no remaining tasks to be completed, the LLM shortlister may send the model output data 543, and the results of processing performed with respect to the previously completed tasks (e.g., previous action response data) to the response arbitration component 560, which is discussed in detail herein below with respect to FIG. 8). The LLM shortlister component 540 may further send the user input data 127, the context data 605, the personalized context data 567, etc., to the plan generation component 535 and/or the response arbitration component 560.

In some embodiments, the LLM orchestrator component 530 may further include a memory storage (not illustrated) which may store various information associated with the processing performed (e.g., user input data 127, the prompt data 615, the context data 605 the personalized context data 567, the model output data 625, prompt data 635, the task processing data 537, the relevant API data 735, the prompt data 715, the action plan data 542, the action response data 558a-n, the model output data 543, etc.) during one or more previous iterations of processing by the LLM orchestrator component 530 for the user input data 127. As such, after the LLM shortlister component 540 generates the model output data 543, the LLM orchestrator component 530 may send the abovementioned data to the memory storage. In some embodiments, the above mentioned data may be sent to the memory storage as it is generated by the system 100.

In such embodiments, one or more of the prompt generation components discussed herein may be configured to include (e.g., append) one or more portions of the data included in the memory storage in the data (e.g., the generated prompts) to the corresponding language models. For example, during a subsequent iteration of processing, the plan prompt generation component 610 may receive one or more portions of the data included in the memory storage (which were generated during one or more previous iterations of processing performed with respect to the user input data 127) and include the one or more portions of data in the prompt data 615.

As discussed herein above, the shortlister language model 740 may be configured to determine whether additional information is needed in order to complete the current task (e.g., if an ambiguity exists in the user input data 127 or the current task, if the current task is to resolve an identified ambiguity, if an API argument is missing from the user input or other available data, etc.), in which case the shortlister language model 740 may send data representing a request for such additional information to the response arbitration component 560. In some embodiments, the action plan data 542 may represent the request for additional information, and the action plan execution component 545 may be configured to send corresponding action data 547 to the personalized context component 565. For example, for the example provided herein above with respect to ordering pizza, the shortlister language model 740 may determine that in order to resolve an ambiguity with respect to the user input data 127 or current task (e.g., based on the current task being to resolve the ambiguity or a determination that the current task cannot be completed due to the ambiguity), the system 100 must "identify user pizza preference," or the like. The system 100 may send a request to the personalized context component 565 to "identify user pizza preference" and the personalized context component 565 may process as described herein above to return personalized context data resolving the ambiguity (e.g., the user's pizza preference may be determined to be a cheese pizza or a pepperoni pizza).

As shown in FIG. 2, the response arbitration component 560 receives the model output data 543 (output by the LLM shortlister component 540) at the response prompt generation component 810. The response prompt generation component 810 may further receive personalized context data 567 (from the LLM shortlister component 540 or the personalized context component 565) and context data 842. In some embodiments, the context data 842 may correspond to various contextual information associated with the user input (e.g., dialog history data, historical user input data, weather data, time of day, user ID, device information associated with the device that sent the user input data 127 (e.g., device ID, device states, historical device interaction data, etc.), etc.). As discussed herein below, the response arbitration component 560 may further receive additional information from the LLM shortlister component 540, such as the potential responses of processing performed with respect to previous tasks (e.g., previous action response data) associated with the user input, and the user input data 127.

The personalized context data 567 may represent one or more contextual signals associated with the user 105, such as information associated with a user profile of the user 105 (e.g., user ID, user behavioral information, user preferences, age, gender, historical user interaction data, devices associated with the user profile, etc.), which may be determined using, for example, a user recognition component 995. In some embodiments, an indication of the user 105 and/or user profile may be included in the user input data 127 (e.g., as included in the output of the ASR component 650.). In some embodiments, the personalized context data 567 may include dialog history data representing one or more user inputs and corresponding system-generated responses for a current interaction between the user 105 and the system 100.

As used herein, a "dialog" may refer to multiple related user inputs and system 100 outputs (e.g., through user device(s) 110) between the system and the user that may have originated with a single user input initiating the dialog. Thus, the data associated with a dialog may be associated with a same dialog identifier, which may be used by components of the overall system 100 to associate information across the dialog. Subsequent user inputs of the same dialog may or may not start with the user speaking a wakeword. Each natural language input may be associated with a different natural language input identifier, and each natural language input identifier may be associated with a corresponding dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The response prompt generation component 810 may process the model output data 543, context data 842, and the personalized context data 567 (and, optionally, the further information received from the LLM shortlister component 540) to generate prompt data 815 representing a prompt for input to the response language model 820. In some embodiments, the prompt data 815 may be an instruction for the response language model 820 to determine whether one or more of the potential responses represented in the model output data 543 are responsive to the user input given the other information (e.g., the personalized context data 567, the context data 842, the potential responses associated with the previous tasks (e.g., previous action response data) associated with the user input, and the user input data 127) included in the prompt data 815. The prompt data may further be an instruction for the response language model 820 to, if the response language model 820 determines that one or more of the potential responses are responsive to the user input, cause performance of the one or more corresponding actions (e.g., the one or more potential actions included in the selected responses) and/or cause the system 100 to inform the user 105 of the one or more selected responses. For example, in some embodiments, prompt data 815 may further instruct the response language model 820 to generate a natural language summary of the one or more selected responses determined to be responsive to the user input. The prompt data 815 may instruct the response language model 820 to cause the system 100 to output the natural language summary to the user 105.

In some embodiments, the prompt data 815 may further be an instruction for the response language model 820 to, if the response language model 820 determines that none of the potential responses are responsive to the user input, generate a request for additional information from a component of the system 100 and/or the user 105. As discussed above, the additional information may be any information usable to determine and/or perform an action responsive to the user input (e.g., to resolve an ambiguity associated with the user input and/or a task(s) associated with the user input).

In some embodiments, the response prompt generation component 810 may also include in the prompt data 815 a sample processing format to be used by the response language model 820 when processing the prompt. In some embodiments, the response prompt generation component 810 may generate the prompt data 815 according to a template format. For example, the prompt data 815 may adhere to a template format including:

{

"You are a conversational AI agent that communicates with users to satisfy their request or ask clarification questions. If applicable, summarize the responses that satisfy the user's request. If applicable, call the corresponding API's to perform the potential actions that satisfy the user's request. If no response is needed, indicate that."

Here is the user's request:
[user input data 127]
Here are the potential responses:
[model output data 543]
}

In some embodiments, the template format may instruct the response language model 820 as to how it should process to determine whether one or more of the potential responses are responsive to the user input. In some embodiments, the format may further include an indication, such as a label of "User:" indicating the following string of characters/tokens as the user input. In some embodiments, the format may further include a label of "Thought:" instructing the response language model 820 to generate an output representing whether one or more of the potential responses are determined to be responsive to the user input or whether additional information is needed. In some embodiments, the format may further include an indication of "Response:" instructing the response language model 820 to indicate the one or more selected responses determined to be responsive to the user input, generate a summary of the one or more selected responses, and/or generate a request for additional information.

Following such a template format, for example, and for the example user input of "What is the weather for today" and corresponding potential responses output by the LLM shortlister component 540, the response prompt generation component 810 may generate example prompt data 215*a*:

{
"You are a conversational AI agent that communicates with users to satisfy their request or ask clarification questions. If no response is needed, indicate that."
Here is the user's request:
What is the weather for today
Here are the potential responses and potential actions:
Skill component A: It is currently 70 degrees, with a high of 75 and a low of 68
Skill component B: The weather for today is expected to be mostly sunny, but with a chance of rain in the late afternoon
}

For further example, and for the example user input of "please order some pizza for dinner" and corresponding potential responses output by the LLM shortlister component 540, the response prompt generation component 810 may generate example prompt data 215*b*:

{
"You are a conversational AI agent that communicates with users to satisfy their request or ask clarification questions. If no response is needed, indicate that."
Here is the user's request:
Please order some pizza for dinner
Here are the potential responses and potential actions:
  Component A: User ordered Brooklyn style pizza from [Company 1 name]
  API A: Use [Application 1 name] to order pizza from [Company 1 name]
  API B: Use [Application 2 name] to order pizza from [Company 2 name]
}

In some embodiments, the response prompt generation component 810 may also include in the prompt data an instruction to output a response that satisfies certain conditions. Such conditions may relate to generating a response that is unbiased (toward protected classes, such as gender, race, age, etc.), non-harmful, profanity-free, etc. For example, the prompt data 815 may include "Please generate a polite, respectful, and safe response and one that does not violate protected class policy."

The response language model 820 processes the prompt data 815 to generate model output data 825 representing the one or more selected responses determined to be responsive to the user input, the natural language summary of the one or more selected responses, or the request for additional information.

If the response language model 820 determines that one or more of the potential responses are responsive to the user input, the response language model 820 may generate model output data 825 representing the one or more selected responses, or a natural language summary of the one or more selected responses, to be output to the user. For example, based on processing the first example prompt data above, the response language model 820 may select one of the potential responses (e.g., the potential responses from skill component A (e.g., a weather skill component)) determined to be responsive to the user input to generate model output data 225*a*: {"It is currently 70 degrees, with a high of 75 and a low of 68,"} or the like. For further example, based on processing the first example prompt data provided above, the response language model 820 may select more than one of the potential responses (e.g., the potential responses from both the skill component A and skill component B) determined to be responsive to the user input and generate a summary of the selected responses to generate model output data 225*b*: {"It is expected to be mostly sunny today, with a high of 75 and a low of 68, but with a chance of rain in the late afternoon,"} or the like.

As another example, based on processing the second example prompt data provided above, the response language model 820 may select one of the potential responses (e.g., the potential response from Component A (e.g., the personalized context component 565) representing that the user order Brooklyn style pizza from [Company 1 name]) determined to be responsive to the user input to generate model output data 225*a*: {"Ok, I will place an order for Brooklyn style pizza from [Company 1 name],"} or the like. As a further example, based on processing the second example prompt data provided above, the response language model 820 may select more than one of the potential responses (e.g., the potential responses from both component A and API A) determined to be responsive to the user input and generate a summary of the selected responses to generate model output data 225*b*: {"Ok, I will place an order for Brooklyn style pizza from [Company name] using [Application 1 name],"} or the like.

As such, the response language model 820 may select between the one or more potential responses from one or more different components (e.g., for the first example prompt data, the potential responses from the skill component A and the skill component B and, for the second example prompt data, the potential responses from Component A, API A, and API B) to determine that a subset of the potential responses are responsive to the user input. Thereafter, the response language model 820 may cause output of the selected responses (e.g., the subset of potential responses) or a natural language summary of the selected responses to the user.

In some embodiments, the response arbitration component 560 may also generate and send an instruction to the components, (e.g., API(s), components, agents, etc. as discussed herein below with respect to FIG. 5) configured to perform the potential actions included in the selected responses to cause performance of the potential actions (or another component of the system 100 configured to cause the components to perform the potential actions, such as the action plan execution component 545, which is discussed in more detail herein below). For example, in instances where the selected responses include a potential action to be performed, the response language model 820 may further cause the corresponding components to perform the potential action (e.g., cause API A to order the Brooklyn style pizza from [Company 1 name] using [Application 1 name]). In other embodiments, the system 100 may not generate and/or send the instruction until approval to perform the action(s) is received from the user 105.

If the response language model 820 determines that none of the potential responses are responsive to the user input and/or that an ambiguity exists with respect to the user input and/or one or more of the determined tasks, the response language model 820 may generate model output data 825 representing a request to be output to the user and/or the personalized context component 565. For example, based on processing the first example prompt data provided above, the response language model 820 may determine an ambiguity exists with respect to the size of the pizza to be ordered and may generate model output data 225c: {"What size pizza should I order?",} {"What size pizza does the user usually order?",} or the like to be output to the user and/or sent to the personalized context component 565.

As further discussed herein below, one or more of the components discussed herein (e.g., the plan generation component 535 and/or the LLM shortlister component 540) may be capable of determining whether an ambiguity exists in the user input or the current task, and may determine that additional information is needed. In response to such a determination, the component(s) may be further configured to send a request for such additional information to the response arbitration component 560, which may process as described herein to generate a request for the additional information to be sent to the personalized context component 565 or output to the user 105 to solicit the additional information. In some embodiments, the response arbitration component 560 may send the request for additional information to the action plan execution component 545, which may cause output of the request to the user 105 to solicit the additional information.

The response language model 820 may send the model output data 825 to the compliance component 830, which is configured to determine whether model output data generated by the response language model 820 is appropriate for output to the user 105. In other words, the compliance component 830 processes the model output data 825 to determine whether the model output data 825 includes any inappropriate/sensitive information that should not be output to the user 105 (e.g., confidential information, offensive language, etc.). In some embodiments, the compliance component 830 may be configured to compare the model output data 825 to one or more words determined to be inappropriate/sensitive and should not be output to the user 105. In some embodiments, the compliance component 830 may include/implement an ML model. For example, the ML model may process the model output data 825 to determine whether the model output data 825 includes any inappropriate/sensitive information. During training, the ML model may take as input a plurality of training natural language inputs, where the ML model is tasked with classifying a natural language input as including inappropriate/sensitive information or not. The output of the ML model (e.g., 0, 1, a value between 0 and 1, or the like) resulting from processing with respect to a training natural language input may be compared to a corresponding label representing whether the natural language input includes inappropriate/sensitive information or not. Based on the comparison, one or more parameters of the ML may be configured. In some embodiments, the ML model may be a classifier.

If the output of the compliance component 830 indicates that the model output data 825 includes information that is not appropriate for output to the user 105, the compliance component 830 may cause further processing of the model output data 825 by downstream components to halt. In some embodiments, the response arbitration component 560 may cause the response language model 820 to generate new model output data 825 to be evaluated by the compliance component 830. For example, the response arbitration component 560 may cause the response prompt generation component 810 to generate new prompt data, which may include the prompt data 815, the model output data 825, and an indication that the model output data 825 is not appropriate for output to the user 105. The new prompt data may be an instruction to generate new model output data that is appropriate for output to the user 105.

If the output of the compliance component 830 indicates that the model output data 825 is appropriate for output to the user, the compliance component 830 may send the model output data 825 to the output routing component 840. The output routing component 840 processes the model output data 825 to determine one or more components that are to be caused to process in response to the model output data 825. In other words, the output routing component 840 parses the model output data 825 to determine one or more components that the model output data 825 is to be routed to (or that are to be caused to process based on the model output data 825).

For example, in an instance where the response language model 820 determines that one or more of the potential responses are responsive to the user input and generates model output data 825 including the one or more selected responses (or a natural language summary of the one or more selected responses), the output routing component 840 may parse the model output data 825 to determine the selected responses/the natural language summary and send output data 845 corresponding to the selected responses/the natural language summary to a component configured to generate corresponding data to be output to the user 105. For example, the output routing component 840 may send the output data 845 to a TTS component (e.g., the TTS component 556), which may process as described herein below to generate output audio data including synthesized speech corresponding to the output data 845, which the system 100 may send to the user device 110 for output to the user 105. In some embodiments, the system 100 may further include a component configured to generate visual output data (e.g., output image and/or video data) corresponding to the output data 845, which may be sent to the user device 110 to be output to the user.

For further example, in embodiments where the model output data 825 includes selected responses that include one or more potential actions to be performed, the output routing component 840 may process as described herein above to determine the one or more selected responses/the natural language summary and send the output data 845 to the one or more components associated with the selected responses. In such embodiments, the output data 845 may further include an instruction for the one or more components to perform the potential actions corresponding to the selected responses. For example, in some embodiments, the components corresponding to the potential responses included in the model output data 543 may, after generating the potential responses, suspend processing required to perform the potential action included in the potential responses and await an instruction from the system 100 to perform the potential action. As such, the output routing component 840 may include the instruction in the output data 845 to cause the component to perform the potential action. In some embodiments, the output routing component 840 may generate an API call configured to cause the component to perform the action.

In some embodiments, where the model output data 825 includes selected responses that include one or more potential actions to be performed, the output data 845 may further request authorization from the user 105 to perform the one or more potential actions responsive to the user input. After receiving the request authorization (e.g., via a subsequent user input) the response arbitration component 560 may generate and send the corresponding instruction (or API call)

to perform the one or more potential actions responsive to the user input. In some embodiments, the system 100 may store data indicating prior authorization to perform the one or more potential actions responsive to the user input (or one or more actions similar to the one or more potential actions), in which case the response arbitration component 560 may use such data as authorization to perform the one or more potential actions. For example, the user 105 may have previously provided authorization for a set of actions (e.g., turning on outside lights). Thereafter, the system 100 may determine the one or more potential actions to be performed in response to the user input data 127. If the system 100 determines that the one or more actions are included in the set of actions previously authorized by the user 105, the system 100 may not ask for further authorization prior to causing the one or more potential actions to be performed.

For further example, in an instance where the response language model 820 generates model output data 825 including a request for additional information (in response to the response language model 820 determining that none of the potential responses are responsive to the user input and/or an ambiguity exists with respect to the user input and/or one or more of the tasks), which may be determined by the output routing component 840 based on, for example, the model output data 825 including a question, the output routing component 840 may parse the model output data 825 to determine whether the request for additional information is to be sent to the personalized context component 565 and/or output to the user 105. In some embodiments, the response language model 820 may include in the model output data 825 an indication of whether the request for additional information should be sent to the personalized context component 565 and/or output to the user 105. In some embodiments, unless otherwise indicated in the model output data 825, the output routing component 840 may determine to send the request for additional information to the personalized context component 565 prior to outputting the request for additional information to the user 105. In the instance where the personalized context component 565 is unable to resolve the ambiguity (or a component of the system 100 is unable to resolve the ambiguity using the personalized context data generated by the personalized context component 565), the output routing component 840 may determine the request for additional information is to be output to the user 105.

The output data 845 may be sent to the personalized context component 565. As discussed above, the output data 845 may be sent to the personalized context component 565 based on the model output data 825 including a request for additional information and the output routing component 840 determining the request for additional information is to be sent to the personalized context component 565. The personalized context component 565 may process to generate personalized context data associated with the output data 845 (e.g., the request for additional information). The personalized context data may then be sent to another component of the system 100, such as the plan generation component 535, the LLM shortlister component 540, and/or the response arbitration component 560, which may process as discussed herein above.

The personalized context component 565 may be configured to determine and return contextual information associated with a user input. In some embodiments, the personalized context component 565 may query various components and/or storages (e.g., the profile storage 970) for the contextual information. In some embodiments, the personalized context component 565 may include a storage including one or more portions of the contextual information. In other embodiments, the personalized context component 565 may be/implement an LLM. In such embodiments, the personalized context component 565 may be finetuned on personalized information for one or more users, as is discussed in more detail herein below. Further, in such embodiments, the personalized context component 565 (or the system 100) may include a personalized context prompt generation component (not illustrated), which may be configured to generate a prompt including the user input data 127 (or a representation of an intent of the user input) to be input to the LLM. The prompt may be an instruction for the LLM to determine one or more portions of context data (e.g., the personalized context data 567) associated with the prompt.

The output data 845 may be sent to the one or more of the TTS component 556, the skill component 554, the LLM agent component 552, and/or the API provider component 550 (e.g., a device controller component).

The TTS component 556 may be configured to process textual or tokenized input to generate audio data representing synthesized speech corresponding to the textual or tokenized input spoken by a synthetic voice. The processing of the TTS component 556 is discussed in detail below with respect to FIG. 9.

The skill component 554 may be software running on the system component(s) 120 that is akin to a software application. That is, a skill component 554 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 554. For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 554 may operate in conjunction between the system component(s) 120 and other devices, such as the user device 110, in order to complete certain functions. A skill component 554 may include hardware, software, firmware, or the like that may be dedicated to a particular skill component 554 or shared among different skill components 554.

The LLM agent component 552 may correspond to one or more LLM agents. An LLM agent component 552 may correspond to a custom instantiation of an LLM (and other components) that is configured to handle user inputs relating to a particular domain/functionality. In some embodiments, the LLM agent component 552 may be configured to handle specific use cases via particular prompt generation, finetuning of the LLM, etc. For example, the LLM agent component 552a may be configured to handle user inputs/tasks related to information query, the LLM agent component 552b may be configured handle user inputs/tasks related to shopping, the LLM agent component 552c may be configured to handle user inputs/tasks related to ordering food from various restaurants, the LLM agent component

552*d* may be configured to handle user inputs/tasks related to ordering food from a particular restaurant (e.g., a particular pizza restaurant), the LLM agent component 552*e* may be configured to handle user inputs/tasks related to booking a hotel, the LLM agent component 552*f* may be configured to handle user inputs/tasks related to booking a flight, etc.

For example, the TTS component 556 may process as discussed herein above to generate output audio data corresponding to the output data 845 (e.g., output audio data corresponding to the one or more actions/natural language summary responsive to the user input, the request for additional information, etc.). Thereafter, the system 100 may send the output audio data to the device 110 for output to the user 105. For further example, the LLM agent component 552 may process as discussed herein above to cause the corresponding one or more actions corresponding to the output data 845 to be performed. As another example, a device controller component of the API provider component 550 may cause a device to perform an action corresponding to the output data 845. For example, if the action represented by output data 845 is to turn on a living room light (e.g., "turn_on_device (device="living room light")), then the device controller component may identify the corresponding living room light, and instruct the living room light to power on (e.g., change its state to {state: ON}).

In some embodiments, the output data 845 may be sent to the action plan execution component 545, which may send the output data 845 to the corresponding component/API (e.g., the TTS component 556, the skill component 554, the LLM agent component 552, the API provider component 550, etc.).

In some embodiments, the response arbitration component 560 may be configured to further process data representing a potential responses potentially responsive to the user input that is generated by one or more other components of the system 100 not included in the LLM orchestrator component 530. For example, the response arbitration component 560 may further receive data from an orchestrator component 930 (discussed in detail herein below with respect to FIG. 9) representing a potential response to the user input (e.g., the output of the skill component 554), where the orchestration of the processing performed to generate the potential response was performed by the orchestrator component 930, rather than the LLM orchestrator component 530. In such embodiments, the response arbitration component 560 may be further configured to arbitrate between first potential responses received as a result of the processing of the LLM orchestrator component 530 and second potential responses received as a result of the processing of the orchestrator component 930. As discussed above, the response arbitration component 560 may select one or more portions (e.g., potential actions, potential responses, etc.) of the first potential responses and/or the second potential responses that are determined to be responsive to the user input and cause output of the one or more portions (or a summarized representation of the one or more portions) and/or performance of the potential actions corresponding to the selected responses.

In some embodiments, the data received from the orchestrator component 930 may be included in the model output data 543. For example, the orchestrator component 930 may be determined to be configured to perform a function (e.g., cause another component(s) to perform a function) potentially relevant to the user input such that the LLM shortlister component 540 may cause the orchestrator component 930 to generate potential responses potentially responsive to the user input, which may be included in the model output data 543 sent to the response arbitration component 560. Further details regarding the processing of the LLM shortlister component 540 to generate the model output data 543 are discussed herein below with respect to FIG. 7.

As discussed above, the response arbitration component may include a self-learning component. The self-learning component may be configured to collect, store, and distribute various feedback associated with the processing of the one or more components, discussed herein above, with respect to a user input. The self-learning component may use the feedback to cause the one or more components to be updated/trained based on the various feedback. In some embodiments, the self-learning component may be located elsewhere in the system 100, outside of the response arbitration component 560.

For example, the self-learning component may collect and store various information associated with processing with respect to a user input, such as a determined task(s) associated with performance of an action responsive to the user input, a selected task, a prioritization of tasks, a selected API(s), an API-generated potential response(s), interaction history data, dialog history data, or any other data generated during the processing discussed herein below with respect to FIGS. 6-7. The self-learning component may further collect information associated with a user satisfaction with the processing of the system 100. The self-learning component may determine such user satisfaction information based on implicit and explicit feedback signals. For example, an explicit feedback signal may be a follow-up user input associated with the response generated by the system 100 (e.g., "Add milk, please."), the response arbitration component 560 receiving varying results from processing performed by the orchestrator component 930 and the LLM orchestrator component 530 (e.g., a first potential response from the orchestrator component 930 including a potential action of "add milk to your grocery list" and a second potential response from the LLM orchestrator component 530 including a request for additional information of "can you specify the list?"), a request for additional information output to the user and the user's corresponding response, a system-determined quality of a generated request for additional information, etc.

For further example, an implicit feedback signal may be a follow-up user input associated with the response generated by the system 100 (e.g., "Add milk, please."), the response arbitration component 560 receiving varying results from processing performed by the orchestrator component 930 and the LLM orchestrator component 530 (e.g., a first potential response from the orchestrator component 930 including a potential action of "add milk to your grocery list" and a second potential response from the LLM orchestrator component 530 including a potential action of "add milk to your shopping list"), a follow-up user input resulting from a user interrupting output of a system-generated response (e.g., prior to completing output of a system-generated response of "adding milk to your shopping list", the user provides the interrupting user input of "no, add it to my grocery list"), a system-determined quality of a system-generated response attempting to preempt a follow-up user input (e.g., a preemptive system-generated response of "add milk to your shopping list" may receive a lower quality score than a preemptive system-generated response of "do you want to add milk to your shopping list?"), etc.

The various data collected by the self-learning component may be used to update/train one or more system components 120. For example, if a user previously provided a follow-up user input requesting that future outputs be kept to a minimal amount of words, the self-learning component may receive the follow-up user input as an explicit feedback signal and may use the explicit feedback signal to update the response prompt generation component 810. The response prompt generation component 810 may be updated/trained based such that, for a user input associated with the user that provided the follow-up user input, the response prompt generation component 810 may include in the prompt data an indication that the response language model 820 should generate a short and concise response to the user. The response language model 820 may be updated/trained based on the self-learning data such that the response language model 820 is better configured for generating concise responses.

In some embodiments, the various data collected by the self-learning component may be used by the system 100 to update/train one or more components of the system 100. In such embodiments, the self-learning component may send the feedback data to another component of the system 100 to update/train the component. For further example, if a user previously provided a follow-up user input of "Add milk, please," in response to a system-generated response to a user input of "Add eggs to my list", the self-learning component may receive the follow-up user input as an explicit feedback signal and may use the explicit feedback signal to update a user profile associated with the user (e.g., represented in the profile storage 970) and/or update a storage/index of the personalized context component 565. As another example, the personalized context component 565 may be updated/trained such that processing of a similar future input of "Add eggs to my list" may result in the personalized context component 565 generating personalized context data representing that the user has previously also added milk to their list. The system 100 may use this personalized context data to generate a response of "Would you also like me to add milk to your list?".

In some embodiments, the language models 620, 640, 740, 820 may be fine-tuned to perform a particular task(s). Fine-tuning of the language models 620, 640, 740, 820 may be performed using one or more techniques. One example fine-tuning technique is transfer learning that involves reusing a pre-trained model's weights and architecture for a new task. The pre-trained model may be trained on a large, general dataset, and the transfer learning approach allows for efficient and effective adaptation to specific tasks. Another example fine-tuning technique is sequential fine-tuning where a pre-trained model is fine-tuned on multiple related tasks sequentially. This allows the model to learn more nuanced and complex language patterns across different tasks, leading to better generalization and performance. Yet another fine-tuning technique is task-specific fine-tuning where the pre-trained model is fine-tuned on a specific task using a task-specific dataset. Yet another fine-tuning technique is multi-task learning where the pre-trained model is fine-tuned on multiple tasks simultaneously. This approach enables the model to learn and leverage the shared representations across different tasks, leading to better generalization and performance. Yet another fine-tuning technique is adapter training that involves training lightweight modules that are plugged into the pre-trained model, allowing for fine-tuning on a specific task without affecting the original model's performance on other tasks.

In some embodiments, one or more components of the system 100 discussed herein above may be configured to begin processing with respect to data as soon as the data or a portion of the data is available to the one or more components. Some components of the system 100 are generative components/models that can begin processing with respect to portions of data as they are available, instead of waiting to initiate processing after the entirety of data is available. In other words, the system 100 may be configured to stream portions of data associated with processing with respect to a user input to the one or more components such that the one or more components may begin performing their configured processing with respect to that data as soon as it is available to the one or more components. For example, if the output of the plan generation language model 620, the task selection language model 640, and/or the shortlister language model 740 indicates that additional information is needed to complete a first task associated with a user input, a request for the additional information may be sent to the personalized context component 565. Thereafter, the plan generation language model 620, the task selection language model 640, and/or the shortlister language model 740 may continue to process to complete their configured operations. For example, while the personalized context component 565 is processing to determine the additional information, the system 100 may begin processing with respect to a second task associated with the user input. Thereafter, the output of the personalized context component 565 may be sent to the response arbitration component 560 such that once the response arbitration component 560 receives the output of the LLM shortlister component 540, the response arbitration component 560 may resolve the ambiguity that resulted in the request for additional information in order to generate the output data 562. For further example, if the user input data 127 is generated to include the natural language representation of the user input, but the processing required to determine the corresponding contextual signals (e.g., weather data, time of data, dialog history, device information, etc.) is yet to be completed, the plan generation component 535 may begin processing with respect to the natural language representation of the user input. Once the corresponding contextual signals have been generated, the plan generation component 535 may begin processing with respect to the contextual signals and may update downstream components with the result of the processing with respect to the contextual signals.

As another example, if the API shortlister component 720 determines (e.g., with a confidence value that meets or exceeds a particular threshold) that a particular API or API description should be included in the relevant API data, the API shortlister component 720 may provide the corresponding relevant API data to the shortlister prompt generation component 710 so that the shortlister prompt generation component 710 may begin processing with respect to the relevant API data while the API shortlister component 720 continues to determine one or more further relevant API data. In general, the system 100 is capable of performing such streaming and processing of portions of data discussed herein (e.g., for processing with respect to a user input) and updating downstream components with the results of processing of newly available portions of data as the data becomes available for processing.

In some embodiments, one or more of the components discussed herein above may be updated/trained based on various feedback associated with the processing of the one or more components with respect to a user input. For example, the system 100 may include a component that collects and stores various information determined during processing with respect to a user input (e.g., a determined task, a selected task, a prioritization of tasks, a selected API, a generated response, interaction history, dialog history, etc.). The component may further collect information associated with a user satisfaction with the processing of the system 100. The component may determine such user satisfaction information based on implicit and explicit feedback signals. For example, an explicit feedback signal may be a follow-up user input associated with the response generated by the system 100 (e.g., "Add milk, please."), the response arbitration component 560 receiving varying responses from processing performed by the orchestrator component 930 and the LLM orchestrator component 530 (e.g., a first response from the orchestrator component 930 of "add milk to your grocery list" and a second response from the LLM orchestrator component 530 of "can you specify the list?"), a request for additional information output to the user and the user's corresponding response, a system-determined quality of a generated request for clarifying information, etc.

For further example, an implicit feedback signal may be a follow-up user input associated with the response generated by the system 100 (e.g., "Add milk, please."), the response arbitration component 560 receiving varying responses from processing performed by the orchestrator component 930 and the LLM orchestrator component 530 (e.g., a first response from the orchestrator component 930 of "add milk to your grocery list" and a second response from the LLM orchestrator component 530 of "add milk to your shopping list"), a follow-up user input resulting from a user interrupting output of a system-generated response (e.g., prior to completing output of a system-generated response of "adding milk to your shopping list", the user provides the interrupting user input of "no, add it to my grocery list"), a system-determined quality of a system-generated response attempting to preempt a follow-up user input (e.g., a preemptive system-generated response of "add milk to your shopping list" may receive a lower quality score than a preemptive system-generated response of "do you want to add milk to your shopping list?"), etc.

The various data (e.g., the feedback signals) collected by the component may be used by the system 100 to update/train one or more components of the system 100. For example, if a user previously provided a follow-up user input of "Add milk, please," in response to a system-generated response to a user input of "Add eggs to my list", the system 100 may use the explicit feedback signal to update one or more components of the system 100 such that processing of a similar future input of "Add eggs to my list" may result in generation of a response of "Would you also like me to add milk to your list?"

Figure 9:
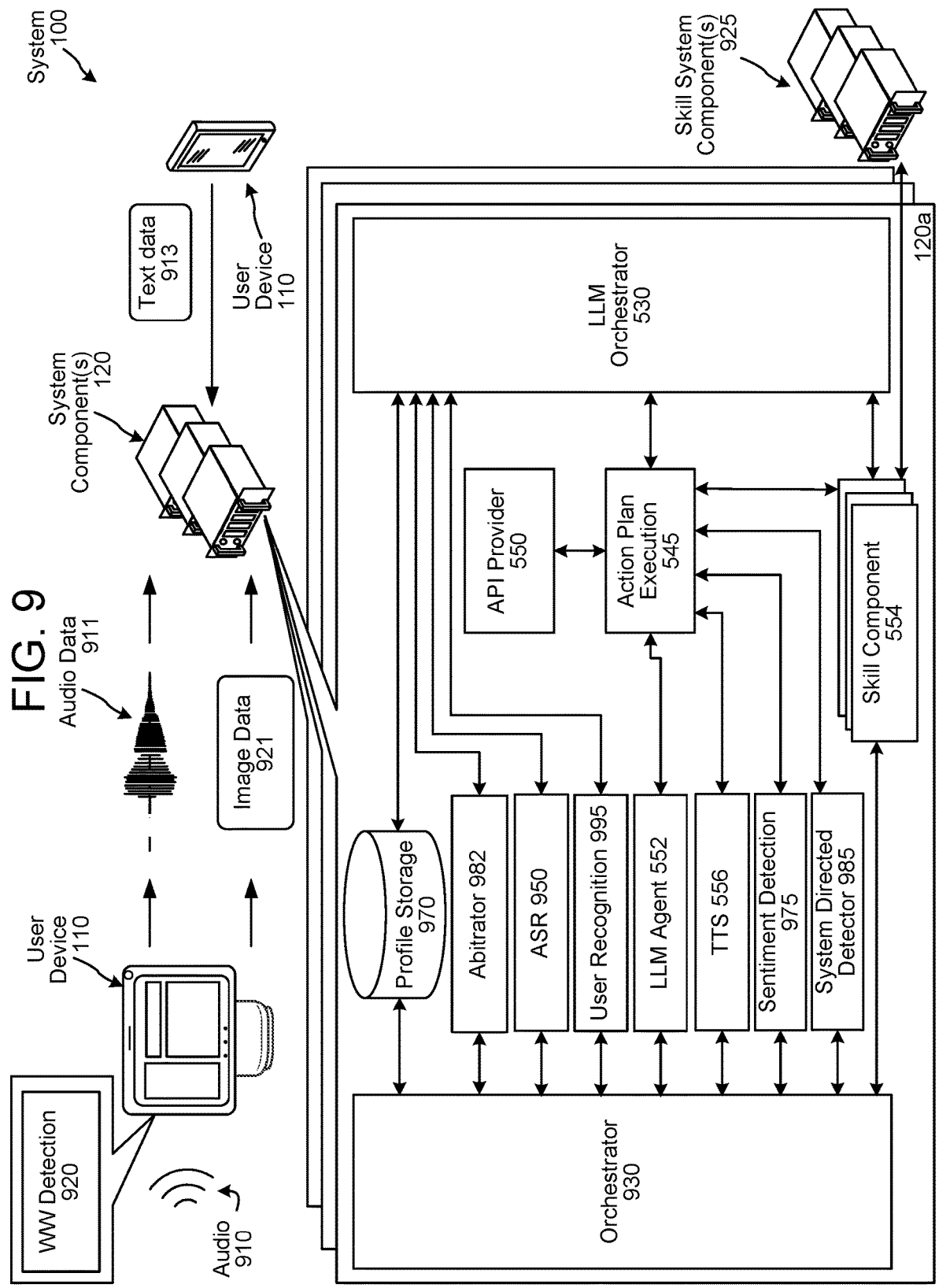
FIG. 9 is a conceptual diagram of components of the system, according to embodiments of the present disclosure.

The system 100 may operate using various components as described in FIG. 9. The various components may be located on same or different physical devices. Communication between various components may occur directly or across a network(s) 199. The user device 110 may include audio capture component(s), such as a microphone or array of microphones of a user device 110, captures audio 911 and creates corresponding audio data. Once speech is detected in audio data representing the audio 911, the user device 110 may determine if the speech is directed at the user device 110/system component(s). In at least some embodiments, such determination may be made using a wakeword detection component 920. The wakeword detection component 920 may be configured to detect various wakewords. In at least some examples, each wakeword may correspond to a name of a different digital assistant. An example wakeword/digital assistant name is "Alexa." In another example, input to the system may be in form of text data 913, for example as a result of a user typing an input into a user interface of user device 110. Other input forms may include indication that the user has pressed a physical or virtual button on user device 110, the user has made a gesture, etc. The user device 110 may also capture images using camera(s) 1118 of the user device 110 and may send image data 921 representing those image(s) to the system component(s). The image data 921 may include raw image data or image data processed by the user device 110 before sending to the system component(s). The image data 921 may be used in various manners by different components of the system to perform operations such as determining whether a user is directing an utterance to the system, interpreting a user command, responding to a user command, etc.

The wakeword detection component 920 of the user device 110 may process the audio data, representing the audio 911, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 911, is analyzed to determine if specific characteristics of the audio data match preconfigured acoustic waveforms, audio signatures, or other data corresponding to a wakeword.

Thus, the wakeword detection component 920 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 920 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detection component 920 and/or input is detected by an input detector, the user device 110 may "wake" and begin transmitting audio data 911, representing the audio 911, to the system component(s) 120. The audio data 911 may include data corresponding to the wakeword; in other embodiments, the portion of the audio corresponding to the wakeword is removed by the user device 110 prior to sending the audio data 911 to the system component(s) 120. In the case of touch input detection or gesture based input detection, the audio data may not include a wakeword.

In some implementations, the system 100 may include more than one system component(s). The system component(s) 120 may respond to different wakewords and/or perform different categories of tasks. Each system component(s) may be associated with its own wakeword such that speaking a certain wakeword results in audio data be sent to and processed by a particular system. For example, detection of the wakeword "Alexa" by the wakeword detection component 920 may result in sending audio data to system component(s) a for processing while detection of the wakeword "Computer" by the wakeword detector may result in sending audio data to system component(s) b for processing. The system may have a separate wakeword and system for different skills/systems (e.g., "Dungeon Master" for a game play skill/system component(s) c) and/or such skills/systems may be coordinated by one or more skill component(s) 554 of one or more system component(s) 120.

The user device 110 may also include a system directed input detector 1085. (The system component(s) may also include a system directed input detector 985 which may operate in a manner similar to system directed input detector 1085.) The system directed input detector 1085 may be configured to determine whether an input to the system (for example speech, a gesture, etc.) is directed to the system or not directed to the system (for example directed to another user, etc.). The system directed input detector 1085 may work in conjunction with the wakeword detection component 920. If the system directed input detector 1085 determines an input is directed to the system, the user device 110 may "wake" and begin sending captured data for further processing (for example, processing audio data using the language processing 992/1092, processing captured image data using image processing component 940/1040 or the like). If data is being processed the user device 110 may indicate such to the user, for example by activating or changing the color of an illuminated output (such as a light emitting diode (LED) ring), displaying an indicator on a display (such as a light bar across the display), outputting an audio indicator (such as a beep) or otherwise informing a user that input data is being processed. If the system directed input detector 1085 determines an input is not directed to the system (such as a speech or gesture directed to another user) the user device 110 may discard the data and take no further action for processing purposes. In this way the system 100 may prevent processing of data not directed to the system, thus protecting user privacy. As an indicator to the user, however, the system may output an audio, visual, or other indicator when the system directed input detector 1085 is determining whether an input is potentially device directed. For example, the system may output an orange indicator while considering an input, and may output a green indicator if a system directed input is detected. Other such configurations are possible.

Upon receipt by the system component(s) 120, the audio data 911 may be sent to an orchestrator component 930 and/or the LLM orchestrator component 530. The orchestrator component 930 may include memory and logic that enables the orchestrator component 930 to transmit various pieces and forms of data to various components of the system, as well as perform other operations as described herein. In some embodiments, the orchestrator component 930 may optionally be included in the system component(s) 120. In embodiments where the orchestrator component 930 is not included in the system component(s) 120, the audio data 911 may be sent directly to the LLM orchestrator component 530. Further, in such embodiments, each of the components of the system component(s) 120 may be configured to interact with the LLM orchestrator component 530, the action plan execution component 545, and/or the API provider component 550.

In some embodiments, the system component(s) 120 may include an arbitrator component 982, which may be configured to determine whether the orchestrator component 930 and/or the LLM orchestrator component 530 are to process with respect to the audio data 911. In some embodiments, the LLM orchestrator component 530 may be selected to process with respect to the audio data 911 only if the user 105 associated with the audio data 911 (or the user device 110 that captured the audio 910) has previously indicated that the LLM orchestrator component 530 may be selected to process with respect to user inputs received from the user 105.

In some embodiments, the arbitrator component 982 may determine the orchestrator component 930 and/or the LLM orchestrator component 530 are to process with respect to the audio data 911 based on metadata associated with the audio data 911. For example, the arbitrator component 982 may be a classifier configured to process a natural language representation of the audio data 911 (e.g., output by the ASR component 950) and classify the corresponding user input as requiring the processing of the orchestrator component 930 and/or the LLM orchestrator component 530. For further example, the arbitrator component 982 may determine whether the device from which the audio data 911 is received is associated with an indicator representing the audio data 911 is to be processed by the orchestrator component 930 and/or the LLM orchestrator component 530. As an even further example, the arbitrator component 982 may determine whether the user (e.g., determined using data output from the user recognition component 995) from which the audio data 911 is received is associated with a user profile including an indicator representing the audio data 911 is to be processed by the orchestrator component 930 and/or the LLM orchestrator component 530. As another example, the arbitrator component 982 may determine whether the audio data 911 (or the output of the ASR component 950) corresponds to a request representing that the audio data 911 is to be processed by the orchestrator component 930 and/or the LLM orchestrator component 530 (e.g., a request including "let's chat" may represent that the audio data 911 is to be processed by the LLM orchestrator component 530). In some embodiments, if the arbitrator component 982 is unsure (e.g., a confidence score corresponding to whether the orchestrator component 930 and/or the LLM orchestrator component 530 is to process is below a threshold), then the arbitrator component 982 may send the audio data 911 to both of the orchestrator component 930 and the LLM orchestrator component 530. In such embodiments, the orchestrator component 930 and/or the LLM orchestrator component 530 may include further logic for determining further confidence scores during processing representing whether the orchestrator component 930 and/or the LLM orchestrator component 530 should continue processing.

The arbitrator component 982 may send the audio data 911 to an ASR component 950. In some embodiments, the component selected to process the audio data 911 (e.g., the orchestrator component 930 and/or the LLM orchestrator component 530) may send the audio data 911 to the ASR component 950. The ASR component 950 may transcribe the audio data 911 into text data. The text data output by the ASR component 950 represents one or more than one (e.g., in the form of an N-best list) ASR hypotheses representing speech represented in the audio data 911. The ASR component 950 interprets the speech in the audio data 911 based on a similarity between the audio data 911 and pre-established language models. For example, the ASR component 950 may compare the audio data 911 with models for sounds (e.g., acoustic units such as phonemes, senons, phones, etc.) and sequences of sounds to identify words that match the sequence of sounds of the speech represented in the audio data 911. The ASR component 950 sends the text data generated thereby to the arbitrator component 982, the orchestrator component 930, and/or the LLM orchestrator component 530. In instances where the text data is sent to the arbitrator component 982, the arbitrator component 982 may send the text data to the component selected to process the audio data 911 (e.g., the orchestrator component 930 and/or the LLM orchestrator component 530). The text data sent from the ASR component 950 to the arbitrator component 982, the orchestrator component 930, and/or the LLM orchestrator component 530 may include a single top-scoring ASR hypothesis or may include an N-best list including multiple top-scoring ASR hypotheses. An N-best list may additionally include a respective score associated with each ASR hypothesis represented therein.

In some embodiments, after determining that the orchestrator component 930 and/or the LLM orchestrator component 530 should process with respect to the user input data 127, the arbitrator component 982 may be configured to periodically determine whether the orchestrator component 930 and/or the LLM orchestrator component 530 should continue processing with respect to the user input data 127. For example, after a particular point in the processing of the orchestrator component 930 (e.g., after performing NLU, prior to determining a skill component 554 to process with respect to the user input data 127, prior to performing an action responsive to the user input, etc.) and/or the LLM orchestrator component 530 (e.g., after selecting a task to be completed, after receiving the action response data from the one or more components, after completing a task, prior to performing an action responsive to the user input, etc.) the orchestrator component 930 and/or the LLM orchestrator component 530 may query the arbitrator component 982 has determined that the orchestrator component 930 and/or the LLM orchestrator component 530 should halt processing with respect to the user input data 127. As discussed above, the system 100 may be configured to stream portions of data associated with processing with respect to a user input to the one or more components such that the one or more components may begin performing their configured processing with respect to that data as soon as it is available to the one or more components. As such, the arbitrator component 982 may cause the orchestrator component 930 and/or the LLM orchestrator component 530 to begin processing with respect to a user input as soon as a portion of data associated with the user input data 127 is available (e.g., the ASR data, context data, output of the user recognition component 995. Thereafter, once the arbitrator component 982 has enough data to perform the processing described herein above to determine whether the orchestrator component 930 and/or the LLM orchestrator component 530 is to process with respect to the user input, the arbitrator component 982 may inform the corresponding component (e.g., the orchestrator component 930 and/or the LLM orchestrator component 530) to continue/halt processing with respect to the user input at one of the logical checkpoints in the processing of the orchestrator component 930 and/or the LLM orchestrator component 530.

As discussed herein above, in some embodiments, the LLM shortlister component 540 (e.g., via the API shortlister component 720 and/or the shortlister language model 740) may be configured to select the orchestrator component 930 to process with respect to the user input and/or a current task to return action response data (e.g., the action response data 597a) representing a response to the user input/current task or a description of an action the orchestrator component 930 may cause to be performed in response to the user input/current task. As such, in some embodiments, although the LLM orchestrator component 530 is determined to process with respect to a user input, the LLM orchestrator component 530 may determine, during such processing, that the orchestrator component 930 should process with respect to the user input.

A skill system component(s) 925 may communicate with a skill component(s) 554 within the system component(s) 120 directly with the orchestrator component 930 and/or the action plan execution component 545, or with other components. A skill system component(s) 925 may be configured to perform one or more actions. An ability to perform such action(s) may sometimes be referred to as a "skill." That is, a skill may enable a skill system component(s) 925 to execute specific functionality in order to provide data or perform some other action requested by a user. For example, a weather service skill may enable a skill system component(s) 925 to provide weather information to the system component(s) 120, a car service skill may enable a skill system component(s) 925 to book a trip with respect to a taxi or ride sharing service, an order pizza skill may enable a skill system component(s) 925 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system component(s) 120 may be configured with a skill component 554 dedicated to interacting with the skill system component(s) 925. Unless expressly stated otherwise, reference to a skill, skill device, or skill component may include a skill component 554 operated by the system component(s) 120 and/or skill operated by the skill system component(s) 925. Moreover, the functionality described herein as a skill or skill may be referred to using many different terms, such as an action, bot, app, or the like. The skill component 554 and or skill system component(s) 925 may return output data to the orchestrator component 930.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems typically need to recognize, retain, and use information collected during more than one input during a back-and-forth or "multi-turn" interaction with the user.

The system component(s) includes a TTS component 556. The TTS component 556 may generate audio data (e.g., synthesized speech) from text data using one or more different methods. Text data input to the TTS component 556 may come from a skill component 554, the orchestrator component 930, or another component of the system. In one method of synthesis called unit selection, the TTS component 556 matches text data against a database of recorded speech. The TTS component 556 selects matching units of recorded speech and concatenates the units together to form audio data. In another method of synthesis called parametric synthesis, the TTS component 556 varies parameters such as frequency, volume, and noise to create audio data including an artificial speech waveform. Parametric synthesis uses a computerized voice generator, sometimes called a vocoder.

The user device 110 may include still image and/or video capture components such as a camera or cameras to capture one or more images. The user device 110 may include circuitry for digitizing the images and/or video for transmission to the system component(s) 120 as image data. The user device 110 may further include circuitry for voice command-based control of the camera, allowing a user 105 to request capture of image or video data. The user device 110 may process the commands locally or send audio data 911 representing the commands to the system component(s) 120 for processing, after which the system component(s) 120 may return output data that can cause the user device 110 to engage its camera.

The system component(s) 120 may include a user recognition component 995 that recognizes one or more users using a variety of data. However, the disclosure is not limited thereto, and the user device 110 may include a user recognition component 1095 instead of and/or in addition to user recognition component 995 of the system component(s) 120 without departing from the disclosure. User recognition component 1095 operates similarly to user recognition component 995.

The user recognition component 995 may take as input the audio data 911 and/or text data output by the ASR component 950. The user recognition component 995 may perform user recognition by comparing audio characteristics in the audio data 911 to stored audio characteristics of users. The user recognition component 995 may also perform user recognition by comparing biometric data (e.g., fingerprint data, iris data, etc.), received by the system in correlation with the present user input, to stored biometric data of users assuming user permission and previous authorization. The user recognition component 995 may further perform user recognition by comparing image data (e.g., including a representation of at least a feature of a user), received by the system in correlation with the present user input, with stored image data including representations of features of different users. The user recognition component 995 may perform additional user recognition processes, including those known in the art.

The user recognition component 995 determines scores indicating whether user input originated from a particular user. For example, a first score may indicate a likelihood that the user input originated from a first user, a second score may indicate a likelihood that the user input originated from a second user, etc. The user recognition component 995 also determines an overall confidence regarding the accuracy of user recognition operations.

Output of the user recognition component 995 may include a single user identifier corresponding to the most likely user that originated the user input. Alternatively, output of the user recognition component 995 may include an N-best list of user identifiers with respective scores indicating likelihoods of respective users originating the user input. The output of the user recognition component 995 may be used to inform processing of the arbitrator component 982, the orchestrator component 930, and/or the LLM orchestrator component 530 as well as processing performed by other components of the system.

The system component(s) 120/user device 110 may include a presence detection component that determines the presence and/or location of one or more users using a variety of data.

The system 100 (either on user device 110, system component(s), or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 970 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component(s) with permission to allow the skill to execute with respect to the user's natural language user inputs. If a user does not enable a skill, the system component(s) may not invoke the skill to execute with respect to the user's natural language user inputs.

The profile storage 970 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 970 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system component(s) 120 may also include a sentiment detection component 975 that may be configured to detect a sentiment of a user from audio data representing speech/utterances from the user, image data representing an image of the user, and/or the like. The sentiment detection component 975 may be included in system component(s) 120, as illustrated in FIG. 9, although the disclosure is not limited thereto and the sentiment detection component 975 may be included in other components without departing from the disclosure. For example the sentiment detection component 1075 may be included in the user device 110, as a separate component, etc. Sentiment detection component 1075 may operate similarly to sentiment detection component 975. The system component(s) may use the sentiment detection component 975 to, for example, customize a response for a user based on an indication that the user is happy or frustrated.

Figure 10:
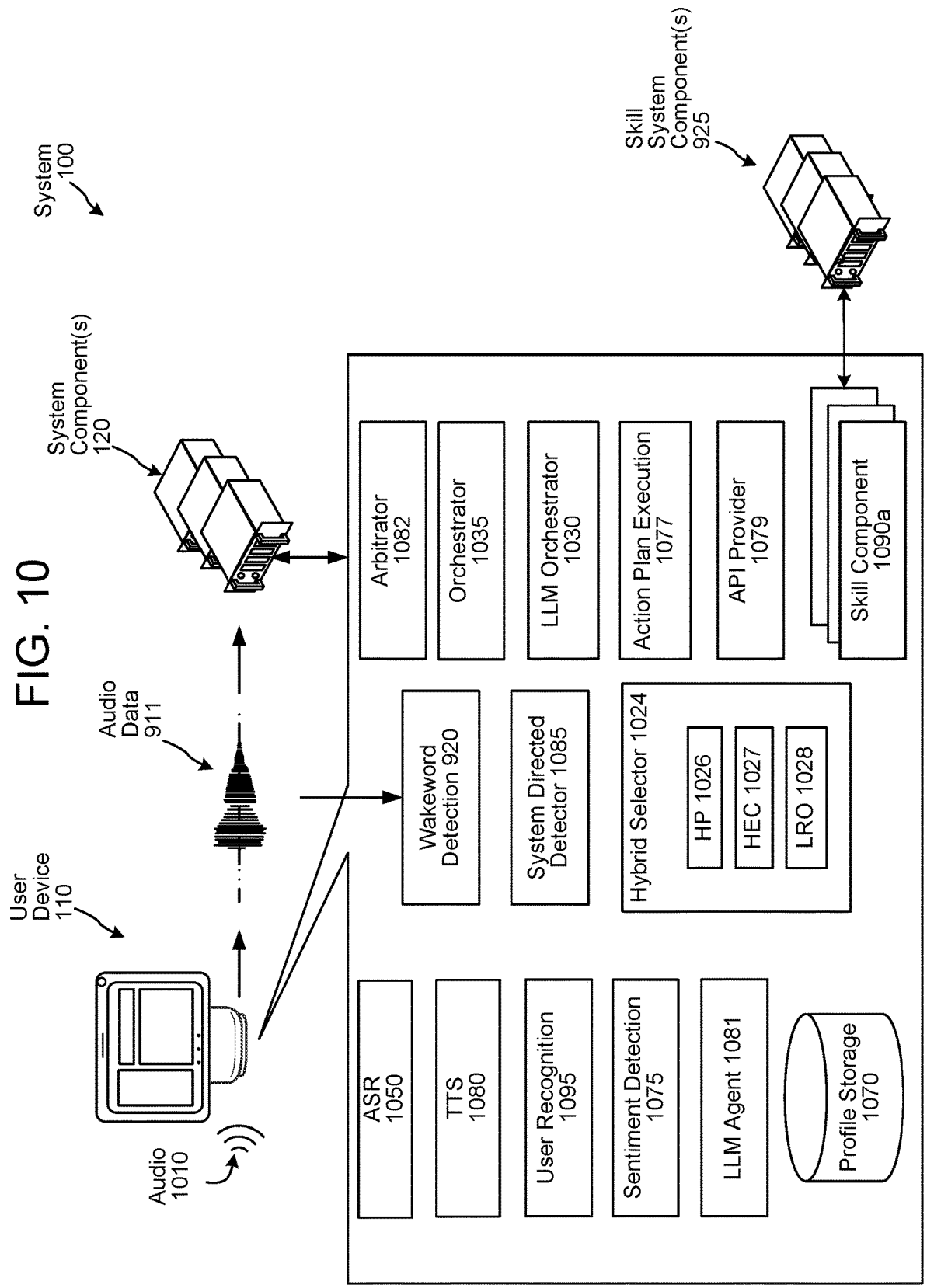
FIG. 10 is a conceptual diagram illustrating components that may be included in a device, according to embodiments of the present disclosure.

Although the components of FIG. 9 may be illustrated as part of system component(s) 120, user device 110, or otherwise, the components may be arranged in other device(s) (such as in user device 110 if illustrated in system component(s) 120 or vice-versa, or in other device(s) altogether) without departing from the disclosure. FIG. 10 illustrates such a configured user device 110.

In at least some embodiments, the system component(s) may receive the audio data 911 from the user device 110, to recognize speech corresponding to a spoken input in the received audio data 911, and to perform functions in response to the recognized speech. In at least some embodiments, these functions involve sending directives (e.g., commands), from the system component(s) to the user device 110 (and/or other devices 110) to cause the user device 110 to perform an action, such as output an audible response to the spoken input via a loudspeaker(s), and/or control secondary devices in the environment by sending a control command to the secondary devices.

Thus, when the user device 110 is able to communicate with the system component(s) over the network(s) 199, some or all of the functions capable of being performed by the system component(s) may be performed by sending one or more directives over the network(s) 199 to the user device 110, which, in turn, may process the directive(s) and perform one or more corresponding actions. For example, the system component(s), using a remote directive that is included in response data (e.g., a remote response), may instruct the user device 110 to output an audible response (e.g., using TTS processing performed by an on-device TTS component 1080) to a user's question via a loudspeaker(s) of (or otherwise associated with) the user device 110, to output content (e.g., music) via the loudspeaker(s) of (or otherwise associated with) the user device 110, to display content on a display of (or otherwise associated with) the user device 110, and/or to send a directive to a secondary device (e.g., a directive to turn on a smart light). It is to be appreciated that the system component(s) may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., a video call) between the user 105 and another user, and so on.

As noted with respect to FIG. 9, the user device 110 may include a wakeword detection component 920 configured to compare the audio data 911 to stored models used to detect a wakeword (e.g., "Alexa") that indicates to the user device 110 that the audio data 911 is to be processed by the user device 110 (e.g., by the orchestrator component 1035 and/or the LLM orchestrator 1030, which are configured similar to the orchestrator component 930 and the LLM orchestrator component 530, respectively). In at least some embodiments, a hybrid selector 1024, of the user device 110, may send the audio data 911 to the wakeword detection component 920. If the wakeword detection component 920 detects a wakeword in the audio data 911, the wakeword detection component 920 may send an indication of such detection to the hybrid selector 1024. In response to receiving the indication, the hybrid selector 1024 may send the audio data 911 to the system component(s) and/or the ASR component 1050. The wakeword detection component 920 may also send an indication, to the hybrid selector 1024, representing a wakeword was not detected. In response to receiving such an indication, the hybrid selector 1024 may refrain from sending the audio data 911 to the system component(s), and may prevent the ASR component 1050 from further processing the audio data 911. In this situation, the audio data 911 can be discarded.

The user device 110 may conduct its own speech processing using on-device language processing components. ASR component 1050 may operate similarly to ASR component 950. The user device 110 may also internally include, or otherwise have access to, other components such as one or more skill components 1090 capable of executing commands based on the output of the orchestrator component 1035, the LLM orchestrator 1030, or other results determined by the user device 110/system component(s) (which may operate similarly to skill components 554), an arbitrator component 1082 (configured to process in a similar manner to that discussed herein above with respect to the arbitrator component 982), an action plan execution component 1077 (configured to process in a similar manner to that discussed herein with respect to the action plan execution component 545), an API provider component 1079 (configured to process in a similar manner to that discussed herein with respect to the API provider component 550), and LLM agent component 1081 (configured to process in a similar manner to that discussed herein with respect to the LLM agent component 552), a user recognition component 1095 (configured to process in a similar manner to that discussed herein with respect to the user recognition component 995 of the system component(s)), profile storage 1070 (configured to store similar profile data to that discussed herein with respect to the profile storage 970 of the system component(s)), or other components. In at least some embodiments, the profile storage 1070 may only store profile data for a user or group of users specifically associated with the user device 110. Similar to as described above with respect to skill component 554, a skill component 1090 may communicate with a skill system component(s) 925. The user device 110 may also have its own TTS component 1080, which may operate similarly to TTS component 556.

In at least some embodiments, the on-device language processing components may not have the same capabilities as the language processing components of the system component(s). For example, the on-device language processing components may be configured to handle only a subset of the natural language user inputs that may be handled by the system component(s). For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system component(s). If the user device 110 attempts to process a natural language user input for which the on-device language processing components are not necessarily best suited, the language processing results determined by the user device 110 may indicate a low confidence or other metric indicating that the processing by the user device 110 may not be as accurate as the processing done by the system component(s).

The hybrid selector 1024, of the user device 110, may include a hybrid proxy (HP) 1026 configured to proxy traffic to/from the system component(s). For example, the HP 1026 may be configured to send messages to/from a hybrid execution controller (HEC) 1027 of the hybrid selector 1024. For example, command/directive data received from the system component(s) can be sent to the HEC 1027 using the HP 1026. The HP 1026 may also be configured to allow the audio data 911 to pass to the system component(s) while also receiving (e.g., intercepting) this audio data 911 and sending the audio data 911 to the HEC 1027.

In at least some embodiments, the hybrid selector 1024 may further include a local request orchestrator (LRO) 1028 configured to notify the ASR component 1050 about the availability of new audio data 911 that represents user speech, and to otherwise initiate the operations of local language processing when new audio data 911 becomes available. In general, the hybrid selector 1024 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the user device 110 receives directive data from the system component(s) and chooses to use that remotely-determined directive data.

Thus, when the audio data 911 is received, the HP 1026 may allow the audio data 911 to pass through to the system component(s) and the HP 1026 may also input the audio data 911 to the on-device ASR component 1050 by routing the audio data 911 through the HEC 1027 of the hybrid selector 1024, whereby the LRO 1028 notifies the ASR component 1050 of the audio data 911. At this point, the hybrid selector 1024 may wait for response data from either or both of the system component(s) or the local language processing components. However, the disclosure is not limited thereto, and in some examples the hybrid selector 1024 may send the audio data 911 only to the local ASR component 1050 without departing from the disclosure. For example, the user device 110 may process the audio data 911 locally without sending the audio data 911 to the system component(s).

The local ASR component 1050 is configured to receive the audio data 911 from the hybrid selector 1024, and to recognize speech in the audio data 911. The user device 110 and/or the system component(s) may associate a unique identifier with each natural language user input. The user device 110 may include the unique identifier when sending the audio data 911 to the system component(s), and the response data from the system component(s) may include the unique identifier to identify which natural language user input the response data corresponds.

In at least some embodiments, the user device 110 may include, or be configured to use, one or more skill components 1090 that may work similarly to the skill component(s) 554 implemented by the system component(s). The skill component(s) 1090 may correspond to one or more domains that are used in order to determine how to act on a spoken input in a particular way, such as by outputting a directive that corresponds to the determined intent, and which can be processed to implement the desired operation. The skill component(s) 1090 installed on the user device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the user device 110 may be in communication with one or more skill system component(s) 925. For example, a skill system component(s) 925 may be located in a remote environment (e.g., separate location) such that the user device 110 may only communicate with the skill system component(s) 925 via the network(s) 199. However, the disclosure is not limited thereto. For example, in at least some embodiments, a skill system component(s) 925 may be configured in a local environment (e.g., home server and/or the like) such that the user device 110 may communicate with the skill system component(s) 925 via a private network, such as a local area network (LAN).

As used herein, a "skill" may refer to a skill component 1090, a skill system component(s) 925, or a combination of a skill component 1090 and a corresponding skill system component(s) 925.

Similar to the manner discussed with regard to FIG. 9, the local user device 110 may be configured to recognize multiple different wakewords and/or perform different categories of tasks depending on the wakeword. Such different wakewords may invoke different processing components of local user device 110 (not illustrated in FIG. 10). For example, detection of the wakeword "Alexa" by the wakeword detection component 920 may result in sending audio data to certain language processing components 1092/skill components 1090 for processing while detection of the wakeword "Computer" by the wakeword detector may result in sending audio data different language processing components 1092/skill components 1090 for processing.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11:
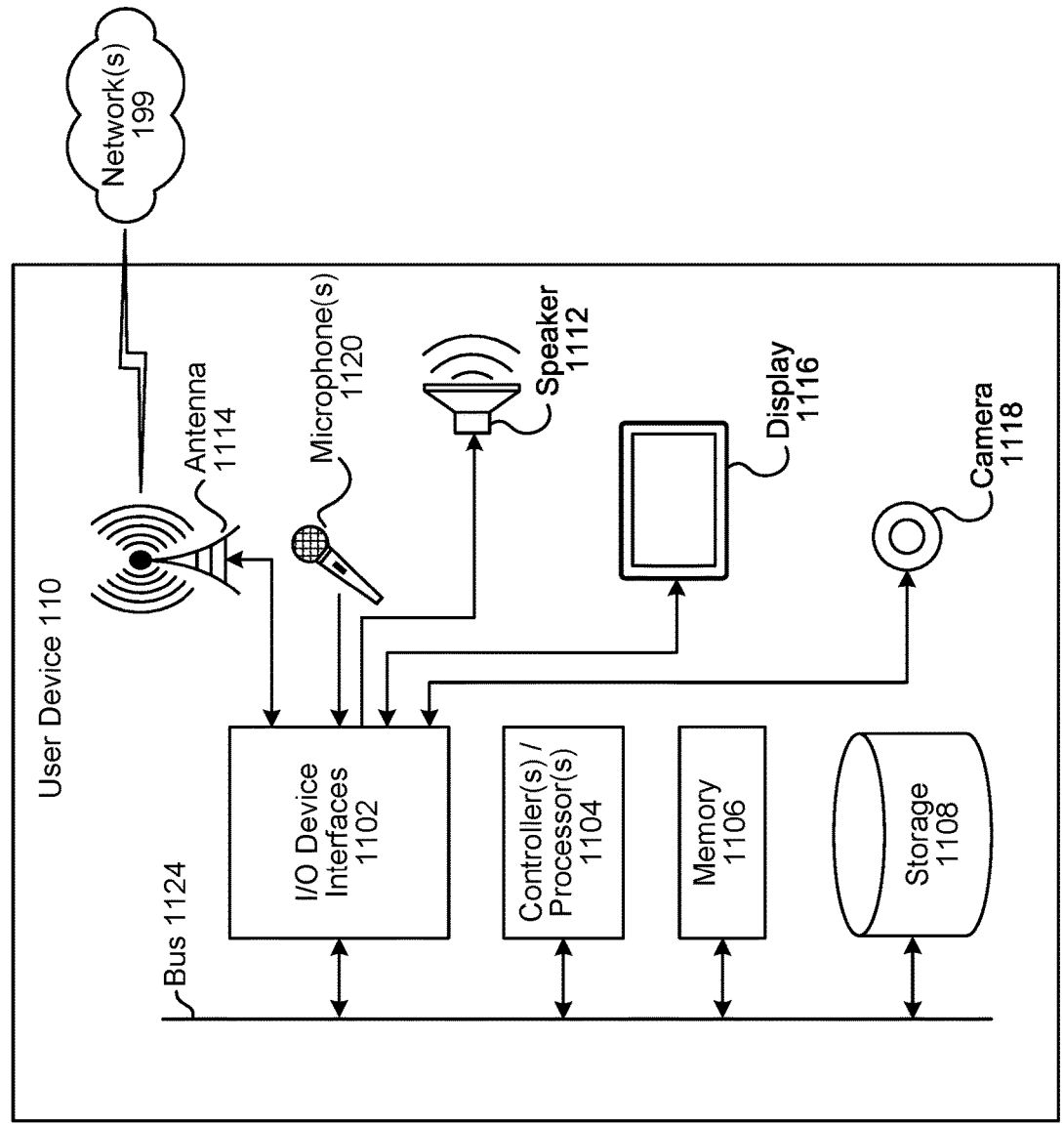
FIG. 11 is a block diagram conceptually illustrating example components of a device according to embodiments of the present disclosure.
Figure 12:
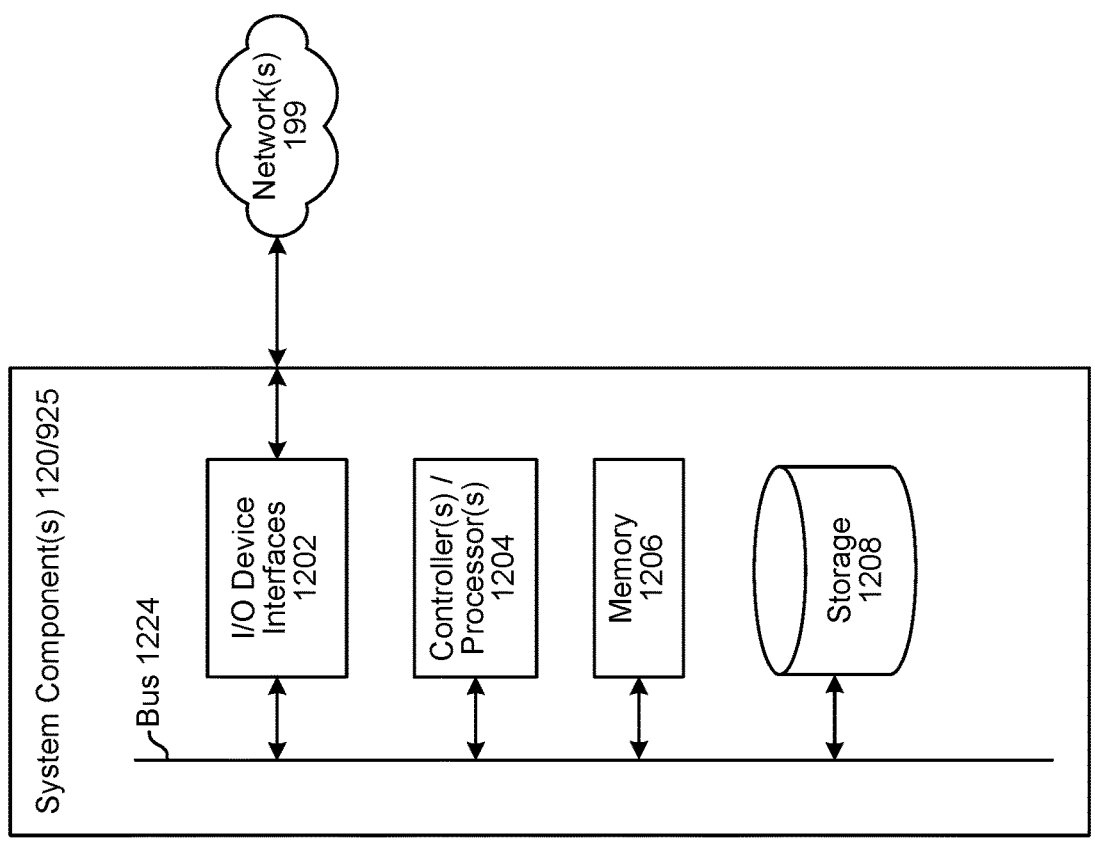
FIG. 12 is a block diagram conceptually illustrating example components of a system according to embodiments of the present disclosure.

FIG. 11 is a block diagram conceptually illustrating a device 110 that may be used with the system. FIG. 12 is a block diagram conceptually illustrating example components of a remote device, such as the system component(s) 120, which may assist with ASR processing, NLU processing, etc., and the skill support system(s) 925. A system (120/925) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/925) may be included in the overall system of the present disclosure, such as one or more system components 120 for performing ASR processing, one or more system components 120 for performing NLU processing, one or more skill systems 925 for performing actions responsive to user inputs, etc. In operation, each of these systems may include computer-readable and computer-executable instructions that reside on the respective device (120/925), as will be discussed further below.

Each of these devices (110/120/925) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/925) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/925) may also be connected to removable or external non-volatile memory and/or storage (such as a removable memory card, memory key drive, networked storage, etc.) through respective input/output device interfaces (1102/1202).

Computer instructions for operating each device (110/120/925) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/925) includes input/output device interfaces (1102/1202). A variety of components may be connected through the input/output device interfaces (1102/1202), as will be discussed further below. Additionally, each device (110/120/925) may include an address/data bus (1124/1224) for conveying data among components of the respective device. Each component within a device (110/120/925) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1114, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the system component(s) 120, or the skill support system(s) 925 may include their own dedicated processors, memory, and/or storage. Alternatively, one or more of the components of the device(s) 110, the system component(s) 120, or the skill support system(s) 925 may utilize the I/O interfaces (1102/1202), processor(s) (1104/1204), memory (1106/1206), and/or storage (1108/1208) of the device(s) 110, system component(s) 120, or the skill support system(s) 925, respectively. Thus, the ASR component 950 may have its own I/O interface(s), processor(s), memory, and/or storage; the NLU component 960 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system component(s) 120, and the skill support system(s) 925, as described herein, are illustrative, and may be located as a stand-alone device or may be included, in whole or in part, as a component of a larger device or system.

Figure 13:
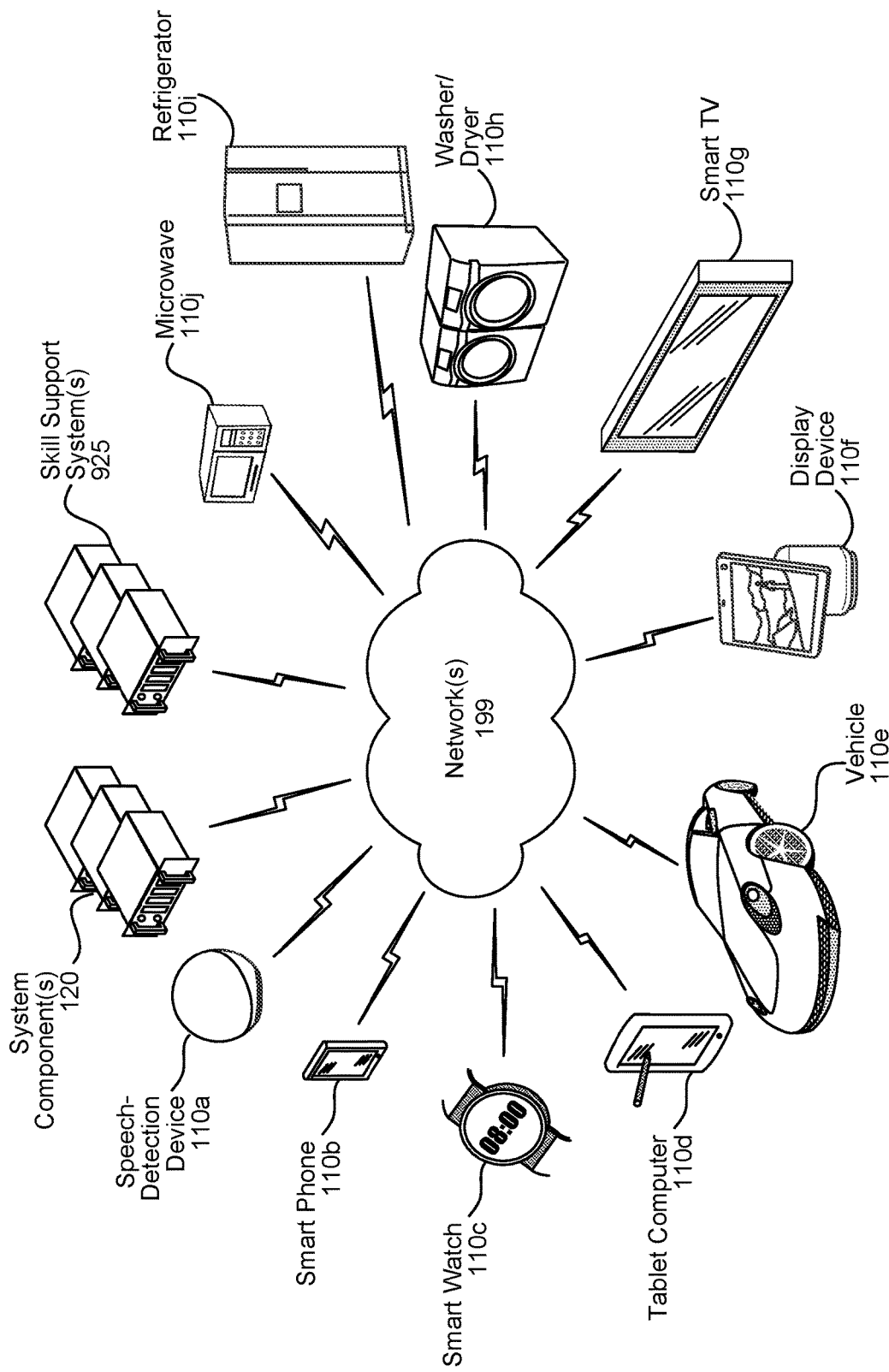
FIG. 13 illustrates an example of a computer network for use with the speech processing system.

As illustrated in FIG. 13, multiple devices (110a-110j, 120, 925) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system component(s) 120, the skill support system(s) 925, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 950, the NLU component 960, etc. of one or more system components 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
  receiving first input data that was previously processed by a large language model (LLM) to generate an undesired response, the first input data corresponding to a first natural language input;
  receiving first output data representing a desired response to the first input data;
  determining first model loss data corresponding to processing of the first input data by the LLM, the first model loss data being based on the first output data;
  determining, using the first model loss data, a first plurality of gradients corresponding to a first layer of the LLM and a second plurality of gradients corresponding to a second layer of the LLM;
  determining, by combining the first plurality of gradients, a first value corresponding to the first layer;
  determining, by combining the second plurality of gradients, a second value corresponding to the second layer;
  determining, based on a comparison of the first value and the second value, that processing by the first layer resulted in the undesired response;
  in response to determining that processing by the first layer resulted in the undesired response, determining an updated first layer by modifying a first plurality of weights of the first layer, wherein the updated first layer is configured to cause generation of the first output data when processing data corresponding to the first natural language input;

determining an updated LLM based on the LLM and including the updated first layer instead of the first layer; and using the updated LLM to process second input data.

2. The computer-implemented method of claim 1, wherein determining the first value further comprises:

determining a third plurality of gradient values corresponding to a first node of the first layer;

determining a first mean value using the third plurality of gradient values;

determining a fourth plurality of gradient values corresponding to a second node of the first layer;

determining a second mean value using the fourth plurality of gradient values; and determining the first value by computing a mean of at least the first mean value and the second mean value.

3. The computer-implemented method of claim 1, wherein determining the updated first layer further comprises:

using a neural network and training data, processing the first plurality of weights of the first layer, wherein the neural network comprises three layers;

based on the processing using the neural network and the training data, determining a second plurality of weights; and determining the updated first layer based on the second plurality of weights.

4. The computer-implemented method of claim 3, further comprising:

determining the training data including at least a first pair of the first input data and the first output data, a second pair of second input data and second output data, and a third pair of third input data and the first output data, wherein the second output data is generated by the LLM based on processing the second input data and the second output data is a desired response to the second input data, and wherein the third input data is semantically similar to the first input data.

5. A computer-implemented method comprising:

receiving first gradient data determined based on a large language model (LLM) processing first input data and generating an undesired response, the first gradient data including at least a first plurality of gradients corresponding to a first layer of the LLM;

determining, using the first plurality of gradients, a first value corresponding to the first layer;

determining, based at least in part on the first value, that processing by the first layer resulted in an undesired response to the first input data;

in response to determining that processing by the first layer resulted in an undesired response, determining a second layer by modifying a first plurality of weights of the first layer;

determining an updated LLM based on the LLM and including the second layer instead of the first layer; and using the updated LLM to process second input data.

6. The computer-implemented method of claim 5, further comprising:

determining, from the first gradient data, a second plurality of gradients corresponding to a first node of the first layer;

using the second plurality of gradients, determining a second value corresponding to the first node;

determining, from the first gradient data, a third plurality of gradients corresponding to a second node of the first layer;

using the third plurality of gradients, determining a third value corresponding to the second node; and determining the first value using at least the second value and the third value.

7. The computer-implemented method of claim 5, further comprising:

receiving model loss data corresponding to processing by the LLM of the first input data, wherein the model loss data is based on a comparison of at least one undesired response and a desired response for the first input data;

using the model loss data, determining a first gradient of the first plurality of gradients corresponding to a first parameter of a first node of the first layer; and using the model loss data, determining a second gradient of the first plurality of gradients corresponding to a second parameter of the first node.

8. The computer-implemented method of claim 5, further comprising:

determining training data including at least a first pair representing the first input data and a desired response corresponding to the first input data; and using a neural network and the training data, training the first layer to determine the second layer.

9. The computer-implemented method of claim 8, further comprising:

determining second input data representing a first input similar to a second input represented in the first input data, the second input data corresponding to the desired response; and determining the training data to further include a second pair representing the second input data and the desired response.

10. The computer-implemented method of claim 5, wherein the first gradient data includes a second plurality of gradient values corresponding to a third layer of the LLM, and the method further comprises:

determining, using the second plurality of gradient values, a second value corresponding to the third layer; and based on comparing at least the first value and the second value, determining that processing by the first layer resulted in at least one undesired response to the first input data.

11. The computer-implemented method of claim 5, further comprising:

receiving second gradient data determined based on a generative model processing third input data and generating an undesired response, the second gradient data including at least a second plurality of gradients corresponding to a third layer of the generative model, wherein the generative model is configured to process a first type of data and generate a second type of data different than the first type;

determining, using the second plurality of gradients, a second value corresponding to the third layer;

determining, based at least in part on the second value, that processing by the third layer resulted in an undesired response to the third input data;

in response to determining that processing by the third layer resulted in an undesired response, determining a fourth layer by modifying a second plurality of weights of the third layer;

determining an updated generative model based on the generative model and including the fourth layer instead of the third layer; and using the updated generative model to process fourth input data.

12. The computer-implemented method of claim 5, further comprising:

determining a second plurality of gradients corresponding to a first portion of the LLM;

determining, using the second plurality of gradients, a second value corresponding to the first portion;

determining, based at least in part on the second value, that processing by the first portion resulted in an undesired response to the first input data;

in response to determining that processing by the first portion resulted in an undesired response, determining a second portion by modifying a second plurality of weights of the first portion; and determining the updated LLM based on the LLM and including the second portion instead of the first portion.

13. A system comprising:

at least one processor; and at least one memory including instructions that, when executed by the at least one processor, cause the system to:

receive first gradient data determined based on a large language model (LLM) processing first input data and generating an undesired response, the first gradient data including at least a first plurality of gradients corresponding to a first layer of the LLM;

determine, using the first plurality of gradients, a first value corresponding to the first layer;

determine, based at least in part on the first value, that processing by the first layer resulted in an undesired response to the first input data;

in response to determining that processing by the first layer resulted in an undesired response, determine a second layer by modifying a first plurality of weights of the first layer;

determine an updated LLM based on the LLM and including the second layer instead of the first layer; and use the updated LLM to process second input data.

14. The system of claim 13, wherein the at least one memory includes further instructions that, when executed by the at least one processor, further cause the system to:

determine, from the first gradient data, a second plurality of gradients corresponding to a first node of the first layer;

using the second plurality of gradients, determine a second value corresponding to the first node;

determine, from the first gradient data, a third plurality of gradients corresponding to a second node of the first layer;

using the third plurality of gradients, determine a third value corresponding to the second node; and determine the first value using at least the second value and the third value.

15. The system of claim 13, wherein the at least one memory includes further instructions that, when executed by the at least one processor, further cause the system to:

receive model loss data corresponding to processing by the LLM of the first input data, wherein the model loss data is based on a comparison of at least one undesired response and a desired response for the first input data;

using the model loss data, determine a first gradient of the first plurality of gradients corresponding to a first parameter of a first node of the first layer; and using the model loss data, determine a second gradient of the first plurality of gradients corresponding to a second parameter of the first node.

16. The system of claim 13, wherein the at least one memory includes further instructions that, when executed by the at least one processor, further cause the system to:

determine training data including at least a first pair representing the first input data and a desired response corresponding to the first input data; and using a neural network and the training data, train the first layer to determine the second layer.

17. The system of claim 16, wherein the at least one memory includes further instructions that, when executed by the at least one processor, further cause the system to:

determine second input data representing a first input similar to a second input represented in the first input data, the second input data corresponding to the desired response; and determine the training data to further include a second pair representing the second input data and the desired response.

18. The system of claim 13, wherein the first gradient data includes a second plurality of gradient values corresponding to a third layer of the LLM, and wherein the at least one memory includes further instructions that, when executed by the at least one processor, further cause the system to:

determine, using the second plurality of gradient values, a second value corresponding to the third layer; and based on comparing at least the first value and the second value, determine that processing by the first layer resulted in at least one undesired response to the first input data.

19. The system of claim 13, wherein the at least one memory includes further instructions that, when executed by the at least one processor, further cause the system to:

receive second gradient data determined based on a generative model processing third input data and generating an undesired response, the second gradient data including at least a second plurality of gradients corresponding to a third layer of the generative model, wherein the generative model is configured to process a first type of data and generate a second type of data different than the first type;

determine, using the second plurality of gradients, a second value corresponding to the third layer;

determine, based at least in part on the second value, that processing by the third layer resulted in an undesired response to the third input data;

in response to determining that processing by the third layer resulted in an undesired response, determine a fourth layer by modifying a second plurality of weights of the third layer;

determine an updated generative model based on the generative model and including the fourth layer instead of the third layer; and use the updated generative model to process fourth input data.

20. The system of claim 13, wherein the at least one memory includes further instructions that, when executed by the at least one processor, further cause the system to:

determine a second plurality of gradients corresponding to a first portion of the LLM;

determine, using the second plurality of gradients, a second value corresponding to the first portion;

determine, based at least in part on the second value, that processing by the first portion resulted in an undesired response to the first input data;

in response to determining that processing by the first portion resulted in an undesired response, determine a second portion by modifying a second plurality of weights of the first portion; and determine the updated LLM based on the LLM and including the second portion instead of the first portion.

* * * * *